US011126505B1

(12) United States Patent
Vig et al.

(10) Patent No.: US 11,126,505 B1
(45) Date of Patent: Sep. 21, 2021

(54) PAST-STATE BACKUP GENERATOR AND INTERFACE FOR DATABASE SYSTEMS

(71) Applicant: Amazon Technologies, Inc., Seattle, WA (US)

(72) Inventors: Akshat Vig, Seattle, WA (US); Tate A. Certain, Seattle, WA (US); Nicholas Gordon, Seattle, WA (US); Go Hori, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 442 days.

(21) Appl. No.: 16/101,153

(22) Filed: Aug. 10, 2018

(51) Int. Cl.
*G06F 16/27* (2019.01)
*G06F 11/14* (2006.01)

(52) U.S. Cl.
CPC ...... *G06F 11/1451* (2013.01); *G06F 11/1461* (2013.01); *G06F 11/1464* (2013.01); *G06F 11/1469* (2013.01); *G06F 11/1471* (2013.01); *G06F 16/27* (2019.01); *G06F 2201/80* (2013.01); *G06F 2201/84* (2013.01)

(58) Field of Classification Search
CPC .. G06F 11/1451; G06F 16/27; G06F 11/1461; G06F 11/1469; G06F 11/1471; G06F 2201/80; G06F 2201/84
USPC ........................................................ 707/649
See application file for complete search history.

(56) References Cited

U.S. PATENT DOCUMENTS

| | | |
|---|---|---|
| 5,586,264 A | 12/1996 | Belknap et al. |
| 5,615,364 A | 3/1997 | Marks |
| 5,692,177 A | 11/1997 | Miller |
| 5,768,527 A | 6/1998 | Zhu et al. |
| 5,813,009 A | 9/1998 | Johnson et al. |
| 5,842,222 A | 11/1998 | Nishimura et al. |
| 5,991,772 A | 11/1999 | Doherty et al. |

(Continued)

FOREIGN PATENT DOCUMENTS

| | | |
|---|---|---|
| CN | 104750773 | 7/2015 |
| JP | 2014141343 | 8/2014 |
| WO | 2012168365 | 12/2012 |

OTHER PUBLICATIONS

"Cloud Spanner: TrueTime and External Consistency", Retrieved from URL: https://cloud.google.com/spanner/docs/true-time-external-consistency on Feb. 28, 2018, pp. 1-6.

(Continued)

*Primary Examiner* — Hanh B Thai
(74) *Attorney, Agent, or Firm* — Robert C. Kowert; Kowert, Hood, Munyon, Rankin & Goetzel, P.C.

(57) ABSTRACT

An interface for requesting, and technique for generation of, a backup of a past state of a database table are provided. Changes made to a database table are accumulated, in durable storage, and snapshots of partitions of the table are obtained. The accumulated changes and the successive partition snapshots are used to generate a past state of the database at any point in time across a continuum between successive snapshots. Although each partition of the table may have a snapshot that was generated at a time different from when other partition snapshots were generated, changes from respective change logs may be selectively log-applied to distinct partitions of a table to generate backup in the past of the entire table at common point-in-time across partitions.

20 Claims, 11 Drawing Sheets

(56) References Cited

U.S. PATENT DOCUMENTS

| | | | |
|---|---|---|---|
| 6,016,553 A * | 1/2000 | Schneider | G06F 11/1435 |
| | | | 714/21 |
| 6,085,200 A | 7/2000 | Hill et al. | |
| 6,161,109 A | 12/2000 | Matamoros et al. | |
| 6,199,074 B1 | 3/2001 | Kern et al. | |
| 6,272,598 B1 | 8/2001 | Arlitt et al. | |
| 6,374,266 B1 | 4/2002 | Shnelvar | |
| 6,374,267 B1 | 4/2002 | Tam | |
| 6,397,351 B1 | 5/2002 | Miller et al. | |
| 6,505,216 B1 | 1/2003 | Schutzman et al. | |
| 6,651,077 B1 | 11/2003 | East et al. | |
| 6,728,735 B1 * | 4/2004 | Fong | G06F 11/1471 |
| | | | 707/642 |
| 6,728,879 B1 | 4/2004 | Atkinson | |
| 7,096,392 B2 | 8/2006 | Sim-Tang | |
| 7,328,226 B1 | 2/2008 | Karr et al. | |
| 7,330,859 B2 | 2/2008 | Gupta et al. | |
| 7,343,356 B2 | 3/2008 | Prahlad et al. | |
| 7,353,241 B2 | 4/2008 | Erlingsson | |
| 7,373,364 B1 | 5/2008 | Chapman | |
| 7,386,586 B1 | 6/2008 | Headley et al. | |
| 7,509,358 B1 | 3/2009 | Bingham et al. | |
| 7,546,428 B1 | 6/2009 | McAndrews et al. | |
| 7,565,661 B2 | 7/2009 | Sim-Tang | |
| 7,606,481 B2 | 10/2009 | Kuruma | |
| 7,606,841 B1 | 10/2009 | Ranade | |
| 7,606,844 B2 | 10/2009 | Kottomtharayil | |
| 7,653,668 B1 | 1/2010 | Shelat et al. | |
| 7,657,781 B1 | 2/2010 | Dixon et al. | |
| 7,668,876 B1 | 2/2010 | Kulkarni | |
| 7,680,843 B1 | 3/2010 | Panchbudhe et al. | |
| 7,689,597 B1 * | 3/2010 | Bingham | G06F 11/1471 |
| | | | 707/999.2 |
| 7,716,186 B2 | 5/2010 | Cannon et al. | |
| 7,730,034 B1 | 6/2010 | Deflaux et al. | |
| 7,792,802 B1 | 9/2010 | Rao | |
| 7,802,001 B1 | 9/2010 | Petry et al. | |
| 7,809,688 B2 * | 10/2010 | Cisler | G06F 3/04847 |
| | | | 707/654 |
| 7,921,077 B2 | 4/2011 | Ting et al. | |
| 7,949,662 B2 | 5/2011 | Farber et al. | |
| 8,041,679 B1 | 10/2011 | Narayanan | |
| 8,065,278 B2 | 11/2011 | Beatty et al. | |
| 8,078,582 B2 | 12/2011 | Wang et al. | |
| 8,095,745 B1 | 1/2012 | Schmidt et al. | |
| 8,108,343 B2 | 1/2012 | Wang et al. | |
| 8,108,429 B2 * | 1/2012 | Sim-Tang | G06F 16/125 |
| | | | 707/790 |
| 8,117,164 B2 | 2/2012 | Spektor et al. | |
| 8,161,255 B2 | 4/2012 | Anglin et al. | |
| 8,166,263 B2 | 4/2012 | Prahlad et al. | |
| 8,190,960 B1 | 5/2012 | Bahadur et al. | |
| 8,200,615 B2 | 6/2012 | Halliday | |
| 8,200,706 B1 * | 6/2012 | Sim-Tang | G06F 11/1469 |
| | | | 707/797 |
| 8,244,679 B1 | 8/2012 | Bilsborough | |
| 8,255,739 B1 | 8/2012 | Chatterjee et al. | |
| 8,332,842 B2 | 12/2012 | Bauer et al. | |
| 8,359,596 B2 | 1/2013 | Kobayashi et al. | |
| 8,364,648 B1 | 1/2013 | Sim-Tang | |
| 8,386,631 B2 | 2/2013 | Nilsson et al. | |
| 8,386,771 B2 | 2/2013 | Baker et al. | |
| 8,429,198 B1 * | 4/2013 | Sim-Tang | G06F 16/2246 |
| | | | 707/797 |
| 8,463,633 B2 | 6/2013 | Jung et al. | |
| 8,478,726 B2 | 7/2013 | Habermann et al. | |
| 8,488,661 B2 | 7/2013 | Menon et al. | |
| 8,510,270 B2 | 8/2013 | Pareek et al. | |
| 8,521,695 B2 | 8/2013 | Zwilling et al. | |
| 8,533,478 B2 | 9/2013 | Aguilera et al. | |
| 8,543,746 B2 | 9/2013 | Roever | |
| 8,548,945 B2 | 10/2013 | Dwyer et al. | |
| 8,566,286 B1 | 10/2013 | Hawton et al. | |
| 8,572,091 B1 | 10/2013 | Sivasubramanian et al. | |
| 8,612,700 B1 | 12/2013 | Armstrong et al. | |
| 8,626,709 B2 | 1/2014 | Isaacson et al. | |
| 8,635,187 B2 | 1/2014 | Beatty et al. | |
| 8,650,155 B2 | 2/2014 | Corbin et al. | |
| 8,676,752 B2 | 3/2014 | Kundu et al. | |
| 8,677,189 B2 * | 3/2014 | Das | G06F 11/1438 |
| | | | 714/38.1 |
| 8,688,645 B2 * | 4/2014 | Sadhwani | G06F 11/1469 |
| | | | 707/681 |
| 8,706,992 B2 * | 4/2014 | Liu | G06F 3/0482 |
| | | | 711/162 |
| 8,712,970 B1 * | 4/2014 | Sim-Tang | G06F 16/20 |
| | | | 707/672 |
| 8,719,362 B2 | 5/2014 | Wu et al. | |
| 8,725,934 B2 | 5/2014 | Batwara et al. | |
| 8,769,223 B2 * | 7/2014 | Boldt | G06F 11/1461 |
| | | | 711/162 |
| 8,805,810 B2 | 8/2014 | Lucas | |
| 8,806,154 B1 * | 8/2014 | Gupta | G06F 3/0644 |
| | | | 711/156 |
| 8,818,954 B1 | 8/2014 | Bergant et al. | |
| 8,825,938 B1 | 9/2014 | Ellard et al. | |
| 8,892,938 B1 | 11/2014 | Sundaram et al. | |
| 9,009,115 B2 * | 4/2015 | Cisler | G06F 11/1469 |
| | | | 707/654 |
| 9,116,847 B2 * | 8/2015 | Liu | G06F 3/0482 |
| 9,183,200 B1 | 11/2015 | Liu et al. | |
| 9,183,268 B2 | 11/2015 | Novick et al. | |
| 9,235,606 B1 | 1/2016 | Mooney et al. | |
| 9,552,382 B2 | 1/2017 | Barrus | |
| 9,558,078 B2 | 1/2017 | Farlee et al. | |
| 9,703,640 B2 * | 7/2017 | Beatty | G06F 11/1469 |
| 9,720,620 B1 | 8/2017 | Wei et al. | |
| 9,720,991 B2 | 8/2017 | Kritchko et al. | |
| 9,785,510 B1 | 10/2017 | Madhavarapu et al. | |
| 10,162,715 B1 | 12/2018 | MacDonald McAlister et al. | |
| 10,338,972 B1 * | 7/2019 | Acheson | G06F 3/0604 |
| 10,621,049 B1 * | 4/2020 | Certain | G06F 11/1471 |
| 10,754,844 B1 * | 8/2020 | Jain | G06F 16/2358 |
| 10,756,976 B2 * | 8/2020 | Tomkins | H04L 41/14 |
| 10,884,869 B2 * | 1/2021 | Shaull | G06F 16/27 |
| 2001/0047380 A1 | 11/2001 | Bamford | G06F 11/1471 |
| | | | 718/1 |
| 2002/0114341 A1 | 8/2002 | Sutherland et al. | |
| 2002/0152299 A1 | 10/2002 | Traversat et al. | |
| 2003/0220935 A1 | 11/2003 | Vivian et al. | |
| 2004/0215803 A1 | 10/2004 | Yamada et al. | |
| 2005/0022213 A1 | 1/2005 | Yamagami | |
| 2005/0188256 A1 | 8/2005 | Stager et al. | |
| 2005/0216535 A1 * | 9/2005 | Saika | G06F 11/1451 |
| 2005/0251540 A1 | 11/2005 | Sim-Tang | |
| 2005/0262097 A1 * | 11/2005 | Sim-Tang | G06F 16/125 |
| 2006/0020634 A1 | 1/2006 | Huras et al. | |
| 2006/0053262 A1 | 3/2006 | Prahlad et al. | |
| 2006/0100972 A1 | 5/2006 | Chianese et al. | |
| 2006/0253600 A1 | 11/2006 | Hannuksela | |
| 2007/0027937 A1 | 2/2007 | McGrattan et al. | |
| 2007/0028853 A1 | 2/2007 | Boyd | |
| 2007/0050577 A1 * | 3/2007 | Kimura | G06F 11/1415 |
| | | | 711/162 |
| 2007/0162516 A1 | 7/2007 | Thiel et al. | |
| 2007/0250835 A1 | 10/2007 | Kobayashi et al. | |
| 2007/0276884 A1 | 11/2007 | Hara et al. | |
| 2007/0288530 A1 | 12/2007 | Romem et al. | |
| 2008/0120459 A1 * | 5/2008 | Kaneda | G06F 11/1451 |
| | | | 711/112 |
| 2008/0177994 A1 * | 7/2008 | Mayer | G06F 9/4418 |
| | | | 713/2 |
| 2008/0294696 A1 | 11/2008 | Frandzel | |
| 2009/0125362 A1 | 5/2009 | Reid et al. | |
| 2009/0238262 A1 | 9/2009 | Miceli | |
| 2009/0271605 A1 | 10/2009 | Park et al. | |
| 2010/0005259 A1 | 1/2010 | Prahlad et al. | |
| 2010/0146004 A1 * | 6/2010 | Sim-Tang | G06F 11/1469 |
| | | | 707/797 |
| 2010/0257138 A1 | 10/2010 | Wang et al. | |
| 2010/0257140 A1 | 10/2010 | Davis et al. | |
| 2010/0262717 A1 | 10/2010 | Critchley et al. | |

(56) References Cited

U.S. PATENT DOCUMENTS

| | | |
|---|---|---|
| 2010/0274762 A1 | 10/2010 | Murphy et al. |
| 2011/0141882 A1 | 6/2011 | Rieschl et al. |
| 2011/0178985 A1 | 7/2011 | San Martin Arribas et al. |
| 2011/0258239 A1 | 10/2011 | Petrocelli |
| 2012/0166401 A1 | 6/2012 | Li et al. |
| 2012/0209817 A1 | 8/2012 | Golab et al. |
| 2012/0221715 A1 | 8/2012 | Hamada |
| 2012/0250682 A1 | 10/2012 | Vincent et al. |
| 2012/0265890 A1 | 10/2012 | Carlson et al. |
| 2012/0297246 A1* | 11/2012 | Liu ............... G06F 11/1456 714/15 |
| 2012/0303999 A1 | 11/2012 | Calder et al. |
| 2012/0317274 A1 | 12/2012 | Richter et al. |
| 2012/0317583 A1 | 12/2012 | Corbea et al. |
| 2013/0018853 A1 | 1/2013 | Jayaraman et al. |
| 2013/0073724 A1 | 3/2013 | Parashar et al. |
| 2013/0124466 A1 | 5/2013 | Naidu et al. |
| 2013/0124483 A1 | 5/2013 | Furuhashi et al. |
| 2013/0124917 A1* | 5/2013 | Das ............... G06F 11/1479 714/6.12 |
| 2013/0132604 A1 | 5/2013 | Cohen et al. |
| 2013/0151683 A1 | 6/2013 | Jain et al. |
| 2013/0152047 A1 | 6/2013 | Moorthi et al. |
| 2013/0166556 A1 | 6/2013 | Baeumges et al. |
| 2013/0262388 A1 | 10/2013 | Sorenson et al. |
| 2013/0290249 A1* | 10/2013 | Merriman ............ G06F 16/273 707/610 |
| 2013/0290642 A1 | 10/2013 | Huang et al. |
| 2013/0346366 A1 | 12/2013 | Ananthanarayanan et al. |
| 2014/0019413 A1 | 1/2014 | Braam et al. |
| 2014/0019421 A1 | 1/2014 | Jagadeesan |
| 2014/0019696 A1* | 1/2014 | Linde ............... G06F 11/1469 711/159 |
| 2014/0046906 A1 | 2/2014 | Patiejunas et al. |
| 2014/0047263 A1 | 2/2014 | Coatney et al. |
| 2014/0074787 A1* | 3/2014 | Berman ............ G06F 11/1451 707/639 |
| 2014/0181042 A1 | 6/2014 | Toyama et al. |
| 2014/0279905 A1 | 9/2014 | Muniswamy-Reddy et al. |
| 2014/0324785 A1 | 10/2014 | Gupta et al. |
| 2014/0358844 A1 | 12/2014 | Mundlapudi et al. |
| 2015/0172412 A1 | 6/2015 | Escriva et al. |
| 2015/0331897 A1* | 11/2015 | Zhou ............... G06F 19/324 707/692 |
| 2016/0077744 A1 | 3/2016 | Pundir et al. |
| 2016/0077923 A1 | 3/2016 | Zhang et al. |
| 2016/0179568 A1* | 6/2016 | Bezbaruah ............ G06F 9/461 718/1 |
| 2016/0241676 A1* | 8/2016 | Armstrong .......... G06F 11/3006 |
| 2016/0267105 A1* | 9/2016 | Sun ............... G06F 16/128 |
| 2016/0306709 A1* | 10/2016 | Shaull ............... G06F 16/2365 |
| 2017/0093755 A1* | 3/2017 | Pol ............... G06F 16/137 |
| 2019/0065322 A1* | 2/2019 | Chakankar ........... G06F 3/0619 |
| 2019/0332267 A1* | 10/2019 | Muniswamy-Reddy ............... G06F 11/1471 |
| 2019/0332268 A1* | 10/2019 | Greenwood ............ G06F 3/061 |
| 2019/0347351 A1* | 11/2019 | Koomthanam ....... H04L 41/084 |
| 2020/0067772 A1* | 2/2020 | Tomkins ............... H04L 41/145 |
| 2020/0133786 A1* | 4/2020 | Ramabhadran ..... G06F 16/1815 |
| 2020/0311142 A1* | 10/2020 | Edelman ............... G06F 16/278 |

OTHER PUBLICATIONS

Randall Hunt, "Keeping Time with Amazon Time Sync Service", AWS News Blog, Retrieved the URL: https://aws.amazon.com/blogs/aws/keeping-time-with-amazon-time-sync-service on Feb. 28, 2018, pp. 1-3.

Barbara Liskov, "Practical Uses of Synchronized Clocks in Distributed Systems", ACM, copyright 1991 ACM, pp. 1-9.

James C. Corbrett, et al., "Spanner: Google's Globally-Distributed Database", Published in the Proceeding of OSDI 2012, 2012, pp. 1-14.

Friedemann Mattern, "Virtual Time and Global States of Distributed Systems", In the Proceedings of the International Workshop on Parallel and Distributed Algorithms, Oct. 1988, pp. 120-134.

U.S. Appl. No. 15/918,920, filed Mar. 12, 2018, Tate Andrew Certain, et al.

"Capturing Table Activity with DynamoDB Streams", dated Oct. 19, 2018, pp. 1-8.

Randall Hunt "New—Amazon DynamoDB Continuous Backups and Points-In-Time Recpvery", Mar. 26, 2018, pp. 1-9.

"Appendix E. Realese Notes", (PostgreSQL: Documentation: 10: E.144. Release 9.0.7), Oct. 19, 2018, pp. 1-4.

"PostgreSQL: THe World's Most Advanced Open Source Relational Database", (https://www.postgresql.org), dated Oct. 19, 2018, pp. 1-10.

U.S. Appl. No. 14/977,472, filed Dec. 21, 2015, Akshat Vig.

U.S. Appl. No. 15/676,933, filed Aug. 14, 2017, Elizabeth Sanocki.

U.S. Appl. No. 15/728,271, filed Oct. 9, 2017, Pradeep Jnana Madhavarapu.

U.S. Appl. No. 14/977,453, filed Dec. 21, 2015, Yan Valerie Leshinsky.

U.S. Appl. No. 15/807,367, filed Nov. 8, 2017, Vaibhav Jain.

U.S. Appl. No. 15/920,207, filed Mar. 13, 2018, Akshat Vig.

U.S. Appl. No. 16/231,109, filed Dec. 21, 2018, Grant Alexander MacDonald McAlister.

U.S. Appl. No. 15/920,193, filed Mar. 13, 2018, Akshat Vig.

U.S. Appl. No. 16/197,033, filed Nov. 20, 2018, Rachit Jain.

Amazon Web Services, "Amazon DynamoDB Developer Guide", API Version, Aug. 10, 2012, pp. 1-793.

Amazon Web Services, "Amazon DynamoDB Streams API Reference", API Version, Aug. 10, 2012, pp. 1-29.

U.S. Appl. No. 14/077,173, filed Nov. 11, 2013, Marvin Michael Theimer et al.

U.S. Appl. No. 14/077,171, filed Nov. 11, 2013, Marvin Michael Theimer et al.

U.S. Appl. No. 14/136,624, filed Dec. 20, 2013, Marvin Michael Theimer et al.

U.S. Appl. No. 14/136,645, filed Dec. 20, 2013, Marvin Michael Theimer et al.

U.S. Appl. No. 14/077,167, filed Nov. 11, 2013, Marvin Michael Theimer et al.

U.S. Appl. No. 14/077,162, filed Nov. 11, 2013, Marvin Michael Theimer et al.

U.S. Appl. No. 14/316,674, filed Jun. 26, 2014, Allan Henry Vermeulen et al.

U.S. Appl. No. 14/537,788, filed Nov. 10, 2014, Lei Ye et al.

International Search Report and Written Opinion From PCT/US2014/065057, dated Feb. 20, 2015, Amazon Technologies, Inc., pp. 1-13.

Alejandro Abdelnur, "Oozie Specification, a Hadoop Workflow System," Oct. 8, 2010, retrieved from http://rvs.github.com/oozie/release/2.2.1/WorkflowFunctionalSpec.html on Feb. 11, 2013, pp. 1-37.

Ani I Pillai and Alejandro Abdelnur, "Oozie Coordinator Specification," Oct. 8, 2010., retrieved from http://rvs.github.com/oozie/releases/2.2.1 /CoordinatorFunctionaiSpec.html on Feb. 11, 2013. pp. 1-43.

"Oozie-Design," retrieved from http://rvs.github.com/oozie/design.html on Feb. 11, 2013. pp. 1-2.

"Quartz Scheduler 2.1.x Documentation," retrieved from http://quartz-scheduler.org/files/documentation/Quartz-2.1.x-Documentation.pdf on Feb. 11, 2013. pp. 1-140.

Apache Kafka, "A High-Throughput Distributed Messaging System", pp. 1-42, Oct. 8, 2013.

Amazon Web Services, "Amazon Simple Queue Service (Amazon SQS)", pp. 1-5, Oct. 8, 2013.

Apache Software Foundation, "Hadoop Streaming", pp. 7-17, 2008.

SIGMOD Record, "Parallel Data Processing with MapReduce: A Survey", Kyong-Ha Lee, et al., pp. 11-20, Dec. 2011.

Splunk Inc., "Splunk for Application Management", pp. 1-2, 2012.

GitHub, "Rationale", pp. 1-2, Oct. 8, 2011.

GitHub, "Tutorial", pp. 1-8, Oct. 8, 2013.

U.S. Appl. No. 13/764,716, filed Feb. 11, 2013, Kathryn Marie Shih et al.

(56) References Cited

OTHER PUBLICATIONS

U.S. Appl. No. 13/764,711, filed Feb. 11, 2013, Kathryn Marie Shih et al.
U.S. Appl. No. 61/738,967, filed Dec. 18, 2012, Kathryn Marie Shih et al.
U.S. Appl. No. 13/465,944, filed May 7, 2012, Jonathan 8. Corley et al.
U.S. Appl. No. 13/465,978, filed May 7, 2012, Jonathan 8. Corley et al.
U.S. Appl. No. 13/476,987, filed May 21, 2012, Jacob Gabrielson et al.
Pierre Dorion, IBM Tivoli Storage Manager backup software tips, Apr. 2009, http://searchdatabackup.techtarget.com/tip/IBMTivoli-Storage-Manager-backup-software-tips.
Lascon, TSM Hints and Tips on Restores, Nov. 10, 2012, LasCon Storage, http://www.lascon.co.uk/tsm-restores.php.
International Search Report and Written Opinion from PCT/US14/65052, dated Feb. 20, 2015, Amazon Technologies, Inc., pp. 1-11.
U.S. Appl. No. 14/753,475, filed Jun. 29, 2015, Allan Henry Vermeulen, et al.
U.S. Appl. No. 14/753,484, filed Jun. 29, 2015, John Michael Morkel, et al.
U.S. Appl. No. 14/753,495, filed Jun. 29, 2015, Timothy Daniel Cole, et al.
U.S. Appl. No. 14/753,505, filed Jun. 29, 2015, Allan Henry Vermeulen, et al.
U.S. Appl. No. 14/482,668, filed Sep. 10, 2014, Allan Henry Vermuelen.
U.S. Appl. No. 14/482,661, filed Sep. 10, 2014, Allan Henry Vermuelen.
U.S. Appl. No. 14/491,454, filed Sep. 19, 2014, Allan Henry Vermeulen.
U.S. Appl. No. 14/491,371, filed Sep. 19, 2014, Allan Henry Vermeulen.
U.S. Appl. No. 14/491,444, filed Sep. 19, 2014, Allan Henry Vermeulen.
U.S. Appl. No. 14/316,630, filed Jun. 26, 2014, Allan Henry Vermeulen.
U.S. Appl. No. 14/316,622, filed Jun. 26, 2014, Allan Henry Vermeulen.
U.S. Appl. No. 14/316,619, filed Jun. 26, 2014, Allan Henry Vermeulen.
U.S. Appl. No. 14/231,077, filed Mar. 31, 2014, Jacob A. Strauss.
U.S. Appl. No. 14/230,378, filed Mar. 31, 2011, Jacob A. Strauss.
Sergio Almeida, et al., "Chain Replication: a Causal + Consistent Datastore based on Chain Replication", Apr. 15-17, 2013, pp. 85-98.
Scott Lystig Fritchie, "Chain Replication in Theory and in Practice", Sep. 30, 2010, pp. 1-11.
Robbert Van Renesse, et al., "Chain Replication for Supporting High Throughput and Availability", 2004, pp. 91-104.
U.S. Appl. No. 15/717,614, filed Sep. 27, 2017, Vaibhav Jain.
U.S. Appl. No. 15,717,606, filed Sep. 27, 2017, Vaibhav Jain.

\* cited by examiner

PAST-STATE BACKUP GENERATOR AND INTERFACE FOR DATABASE SYSTEMS

BACKGROUND

Several leading technology organizations are investing in building technologies that sell "software-as-a-service". Such services provide access to shared storage (e.g., database systems) and/or computing resources to clients, or subscribers. Within multi-tier e-commerce systems, different resources may be allocated to subscribers and/or their applications from whole machines, to CPU, to memory, to network bandwidth, and to I/O capacity.

Database systems managing large amounts of data on behalf of users may distribute and/or replicate that data across two or more machines, often in different locations, for any of a number of reasons, including security issues, disaster prevention and recovery issues, data locality and availability issues, etc. These machines may be configured in a number of ways, including as a shared resource pool. For example, a database table may be split into two or more partitions, each of which may be replicated, and each replica may be stored on a different machine. Interaction between client applications and database servers typically includes read operations (read-only queries), write operations (to store data), and update operations that can be conceptualized using a read-modify-write workflow.

Clients with large-scale databases may create proprietary backup solutions that scan data from a database into scalable, durable storage, but these solutions suffer from a number of problems such as taking too much time to perform the backup, interrupting a customer's regular workflow, tying up resources (e.g., scan-based solutions can compete with production workloads for read throughput), and providing only limited options for restoring from static backups (e.g., periods of time between backups may be too long). Additionally, getting a consistent backup across a large number of storage nodes can be hard to do without the customer stopping all writes. Scan-based solutions can be expensive (e.g., a scan backup of a 100 TB table, etc.) both in compute costs and storage costs and may not provide a managed experience (e.g., a managed experience where customers can view characteristics of the backups, manage the backups, etc.).

Some systems perform timed, periodic backups by scanning the data store to create a copy of the data store. But, the period of time in-between backups of a periodic system may be of a length that prohibits restoring the data store to a particular point-in-time of interest (e.g., if the point-in-time of interest falls in-between to backups).

Some database systems require backup of the entire table (e.g., all partitions are backed-up at once, as a coherent whole). Generally, database systems require obtaining a copy of the entire authoritative database in order to generate the next full backup snapshot.

Additionally, on-demand or scheduled table backups may fail without creating the backup. Failed backups may result in a loss of data and may result in non-compliance with data retention requirements.

Figure 1:
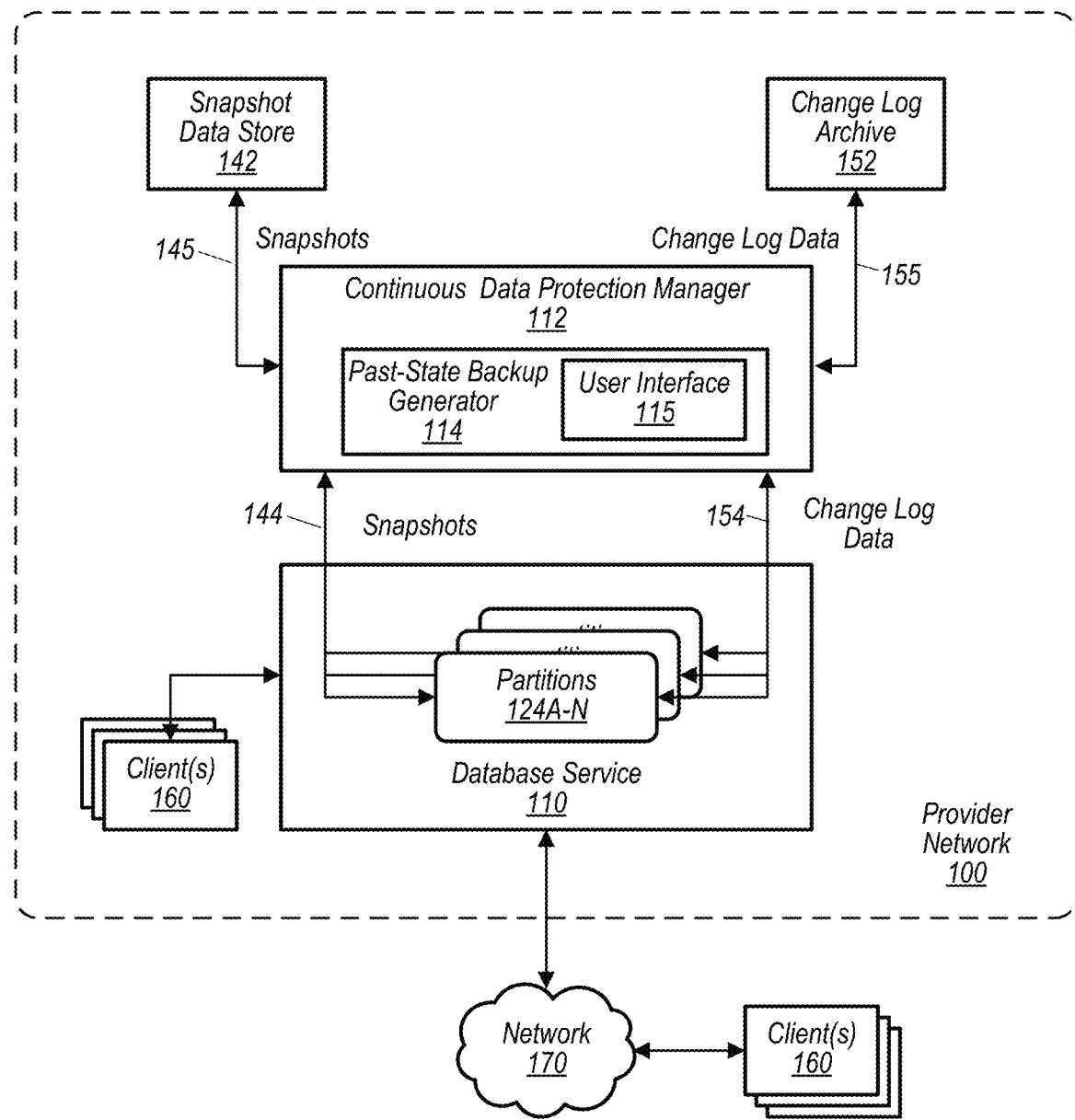
FIG. 1 is a block diagram illustrating logical relationships between components of a continuous data protection system that generates backups of current database tables as of a time in the past, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" be used in a permissive sense (i.e., meaning having the potential to), rather than the mandatory sense (i.e., meaning must). Similarly, the words "include", "including", and "includes" mean including, but not limited to.

DETAILED DESCRIPTION

A continuous data protection service, implemented by a continuous data protection system generates backups of current database tables as of a time in the past (sometimes referred to as a backup-in-the-past). A continuous data protection system may accumulate changes made to a database table, and obtain snapshots of partitions of the table, and store the data in durable storage. In embodiments, a computer system (e.g., a personal computer, or a network-based computer system of a service provider, etc.) provides an interface (GUI, application program interface (API), command line, etc.) for requesting a backup of a past state of a database table. In embodiments, the backup is a copy of a current database table as of a time in the past, for example. The accumulated changes and the successive partition snapshots may be used to generate a past state of the database table at any point in time in the past across a continuum between successive snapshots. Although each partition of the table may have a snapshot that was generated at a time different from when other partition snapshots were generated, changes from respective change logs may be selectively log-applied to distinct partitions of a table to generate a backup in the past of the entire table at common point-in-time across partitions. In some embodiments, the backup-in-the-past is an off-line copy or inactive backup. Such a backup may be used for compliance, or in cases where a replacement of the active copy is not needed (e.g., to create another instance of the database table for performing analytics, or for restoring a copy of the database table in another region, as non-exhaustive examples).

In embodiments, a system of storage nodes implements a database service that stores data for a table in partitions. Copies of the partitions are stored along with change logs that capture changes to the table. Requests to generate copies (sometimes referred to as backups) of a current database table as of a time in the past are received (e.g., via an interface). Generation of the backup in the past may be acknowledged (almost immediately in some embodiments). Table metadata is obtained for the table, and materialization scheduled. Materialization includes a log-apply process that applies segments of the change logs to respective copies of the partitions of the table to generate the new partitions for the backup-in-the-past that are written to locations different from the partitions of the current database table. Creation of the backup-in-the-past does not restore the current database table, in embodiments.

The interface may be configured to allow a requesting customer to specify which table to backup-in-the-past, and a date and time that serves to specify a time in the past for the backup of the table as of the time in the past.

Table metadata for the backup-in-the-past may be obtained by reading the table metadata for the current table and applying a set of stored metadata changes to obtain metadata for the table as of the time in the past.

Requests to generate a backup-in-the-past may be automated. For example, scheduled backups (e.g., compliance backups) may fail. The system may be configured to identify the failure and automatically request generation of a backup-in-the-past as a substitute for the failed scheduled backup.

In some embodiments, materialization of the backup-in-the-past may not be triggered until some time after the acknowledgement. For example, materialization may be triggered near to the end of a retention window for retaining the snapshots and change logs that are used to build the backup-in-the-past. Otherwise, the materialized backup-in-the-past would be somewhat redundant with the data used to create it, in embodiments In some instances (when materialization depends upon expiration of a data retention window) the trigger for materialization may come sooner or later, based on changes to a configurable data retention parameter that specified the length of the data retention window. Some systems may be configured to determine whether storing the snapshots and change logs is more efficient than storing backups generated from the snapshots and change logs, instead. The system may be configured to make a recommendation to generate backups and make the memory storing the corresponding change logs (and snapshots) available, based on the determination.

Generally, a continuous data protection system captures changes happening on the data store (e.g., a database) and periodically builds system snapshots (sometimes referred to as copies, herein) by applying logs on the closest system snapshot, in embodiments. In some embodiments, an initial copy of a database table is created by scanning the table (an initial snapshot, sometimes referred to as a logical backup, herein).

The system may be able to apply transaction logs to a previous logical backup to create a new logical backup, without losing any customer data, in some instances. For example, system snapshots may be built at a partition level (e.g., for systems that partition data) by applying the change logs to prior snapshots. In some such embodiments, the continuous data protection system generates backups without any additional queries or scanning of the client's production data source by relying on prior snapshots and change log data to create new snapshots, instead. Accumulation of change log data for a table, as well as generation of updates to snapshots for the table may be performed independently for each partition (e.g., at a different time) of a same table, based on characteristics particular to each partition for example, in some embodiments.

In embodiments, a log apply service of the continuous data protection system is responsible for at least two core functionalities to support backup generation. For instance, during a conversion process, the log apply service may convert partition snapshots (sometimes referred to as backups) from a physical format (e.g., mysql) to a logical format snapshot. The log apply service may also create subsequent point-in-time logical partition snapshots by applying more recent transaction logs to a previous logical partition snapshot, and create a complete current backup, for example.

In some embodiments, continuous capture of individual changes to a table provide for a more fine-grained availability of those individual changes at a later time. For example, the accumulation of individual changes to the data—data that constitutes a state of the database table at a time, in embodiments, may be used to more accurately make a backup as of any point-in-time along a continuum. Such features contrast with systems that only create backups for a select few points-in-time when snapshots of the system were taken. In some such prior systems, the snapshots added additional burden to the client's production system because the snapshots were created from scans of the production database, interrupting or delaying production services. Additionally, scan-based snapshots take relatively more time to create, and fail to provide as accurate a view of the database as the techniques disclosed herein, at least because, by the time the scan completes (at least for large data sets), data that has already been scanned may have been changed.

Additionally, in at least some embodiments, the techniques described herein are applied on a partition-by-partition basis. For example, snapshots and change log data for a particular partition may be kept in an uncoordinated manner, with respect to the other partitions of the table (e.g., according to different schedules). A relatively inactive partition of a table may have a snapshot generated based on a maximum duration of time threshold, while another relatively active partition of that same table may have snapshots generated more often, based on an amount of accumulated changes, as just one example of many. The times at which the snapshots are created for either partition may not have any relationship, and may be based upon the particular characteristics of that partition, in embodiments.

The above-noted process may be triggered when a customer enables backups for a given table. In embodiments, the continuous data protection manager 112 may initiate the first complete backup of the table, during the initial backup process. For example, for all partitions of the table, the continuous data protection manager or service may store the snapshots by exporting data from storage nodes in storage-level physical format into a durable storage.

In embodiments, a log apply process is used whenever the continuous data protection manager or service decides a new logical partition snapshot is required to bound the time taken for creating a snapshot.

In some systems, log applying to generate backups is an expensive operation (e.g., when there is a relatively greater amount of time and greater number of changes between backups). By relying on pre-existing incremental partition images to define a backup, the system may significantly reduce the load on the log apply service, saving compute costs. Additionally, by relying upon incremental partition images to define a backup, the system may allow users to create many backups partially sharing the same set of logs and base partition images, which may translate into storage costs savings.

In some embodiments, a periodicity at which system snapshots of the partitions are built is decided based on an amount of logs accumulated. For example, the periodicity may be based on a threshold number of logs accumulated. In another example, the periodicity may be based upon a rate of change of the logs accumulated. For instance, if the system is becoming more active more changes are being generated . . . the increase in the rate of change of the number of logs may be used as a trigger to increase the periodicity. In some embodiments, the log apply service applies logs for a single partition on a single host. In some circumstances (e.g., large tables) each partition may be log applied in parallel to reduce the time to apply the logs for the table, e.g., by respective parallel processes.

In embodiments, both the newly-created snapshots as well as the change logs are stored to durable storage. In some such embodiments, the snapshots and the durably-stored change logs may be used to restore the partition. In some embodiments, the continuous data protection service provides an interface and functionality supporting unified management of the data, while optimizing customer costs and restore times via periodic log application and trimming.

Data Storage Service

The systems and methods described herein may be employed in various combinations and in various embodiments to implement a network-based service that provides data storage services to storage service clients (e.g., user, subscribers, or client applications that access the data storage service on behalf of users or subscribers). The service may, in some embodiments, support the continuous data protection of tables that are maintained on behalf of clients in a data store, e.g., a non-relational database or other type of database. The service may provide a high level of durability and availability through replication, in some embodiments. For example, in some embodiments, the data storage service may store data in multiple partitions (e.g., partitions that each contain a subset of the data in a table being maintained on behalf of a client), and may store multiple replicas of those partitions on respective storage devices or virtual storage volumes of different storage nodes.

In some embodiments, the data storage systems described herein may provide mechanisms for backing up a database table as a synchronous operation while the database continues to receive, accept, and service read and/or write operations that are directed to the table. In some embodiments, in response to a request to back up a table (or to generate a backup of a table as of a time in the past), the system may create a backup of each individual partition independently and (in some cases) in parallel (i.e., substantially concurrently). In embodiments, when a request to back up a table is received, the system may guarantee that all write operations that were directed to the table up to that point are included in the backup. In some embodiments, such a guarantee may not be made.

In some embodiments, backup operations (e.g., requests to generate a backup of a current database table as of a time in the past) may be initiated by data storage service users (e.g., customers, service subscriber, and/or client applications) using a "CreateBackupInThePast" application programming interface (API). In some embodiments, the systems described herein may support the scheduling of backups (e.g., every day at a particular time, or according to a published, but not necessarily periodic, schedule). Some such scheduled backups may be requested for compliance reasons. Sometimes, for any of various reasons, scheduled backups for compliance (e.g., compliance backups) may fail. The interfaces and techniques described herein provide customers with the ability to effectively go back in time and generate the failed backup as of the time of the intended compliance backup, for example.

In response to receiving a request to back up a table as of a time in the past, these systems may back up each partition of the table as an individual item in a remote storage system (e.g., a key-value durable storage system), and may store metadata about the backup that is subsequently usable when restoring the backup to a new database (e.g., a new database table). In some embodiments, the system may be configured to initiate separate backup operations for each of the partitions of a table automatically (e.g., programmatically and without user intervention) in response to a request to back up the table, and to manage those backup operations on a per-partition basis (again, without user involvement).

In various embodiments, the data storage service described herein may provide an application programming interface (API) that includes support for some or all of the following operations on the data in a table maintained by the service on behalf of a storage service client: put (or store) an item, get (or retrieve) one or more items having a specified primary key, delete an item, update the attributes in a single item, query for items using an index, and scan (e.g., list items) over the whole table, optionally filtering the items returned. The amount of work required to satisfy service requests that specify these operations may vary depending on the particular operation specified and/or the amount of data that is accessed and/or transferred between the storage system and the client in order to satisfy the request.

In embodiments, the system disclosed herein may implement an application program interface (API) that provides access to configuration setting associated with the partition, the configuration settings including, but not limited to: a maximum backup time that indicates a maximum period of time between snapshots of the partition; a minimum backup time that indicates a minimum period of time between snapshots of the partition; and a duration of time to retain snapshots of the partition.

Another API may allow consumers to update the current settings for a table within the database service, for example, to enable or disable the continuous backups and modify the duration of time to retain backups.

Yet another API may provide the option to enable continuous backups for a table. The triggered action may initiate the creation of a continuous backup through the workflow described herein, such as by initiation of the archival copy of logs for a table and creation of an initial backup of a table in a logical format.

In various embodiments, the systems described herein may store data in replicated partitions on multiple storage nodes (which may be located in multiple data centers) and may implement a single master failover protocol. For example, each partition may be replicated on two or more storage nodes (or storage devices thereof) in a distributed database system, where those replicas make up a replica group. In some embodiments, membership in various replica groups may be adjusted through replicated changes, and membership and other updates in the system may be synchronized by synchronizing over a quorum of replicas in one or more data centers at failover time.

In some embodiments of the distributed database systems described herein, each storage node may include multiple storage devices or logical volumes, each of which stores various partition replicas. For example, in one embodiment, each storage node of the distributed database system may include multiple storage devices or logical storage volumes. In some embodiments, one or more mechanisms may be implemented on each of the storage nodes for determining, on a local level (e.g., on a storage node basis) whether and/or how to split a partition or move a partition (or a given replica of a partition), based on the current utilization of provisioned resources and/or other information. For example, one of the storage nodes may be configured to determine that a partition for which a replica is stored on one of its storage devices (e.g., disks) or logical storage volumes should be split into two new partitions, and may divide the data in the partition by hash ranges, by key space ranges, or using other criteria to divide the data between the two new partitions. In another example, a storage node may be configured to determine that one or more partitions (or replicas thereof) should be moved from a given storage device or logical storage volume to another storage device or logical storage volume, e.g., in order to reduce the amount of provisioned storage capacity or throughput capacity on the given storage device or logical storage volume.

As noted above, from a user's perspective, a backup operation generally operates to create a backup of a whole table, but internally, the system may back up each partition of the table independently, such that consistency is guaranteed only up to a particular transaction or write operation on a per partition basis (rather than across the whole table). In some embodiments, the system may be configured to maintain metadata about the table (e.g., to keep track of the table schema, and the state of the world from the perspective of the table and of each partition). In some embodiments, this metadata may be stored in the data storage system itself, and a copy of the metadata may also be stored in the remote storage system into which tables are backed up.

FIG. 1 is a block diagram illustrating logical relationships between components of a continuous data protection system that generates backups of current database tables as of a time in the past, according to some embodiments. Provider network 100 may be a private or closed system, in one embodiment, or may be set up by an entity such as a company or a public-sector organization to provide one or more services (such as various types of cloud-based storage) accessible via the Internet and/or other networks to clients 160, in another embodiment. In one embodiment, provider network 100 may be implemented in a single location or may include numerous data centers hosting various resource pools, such as collections of physical and/or virtualized computer servers, storage devices, networking equipment and the like (e.g., computing system 1100 described below with regard to FIG. 11), needed to implement and distribute the infrastructure and storage services offered by the provider network 100. In one embodiment, provider network 100 may implement various computing resources or services, such as a database service 110 or other data processing (e.g., relational or non-relational (NoSQL) database query engines, data warehouse, data flow processing, and/or other large scale data processing techniques), data storage services (e.g., an object storage service, block-based storage service, or data storage service that may store different types of data for centralized access), virtual compute services, and/or any other type of network based services (which may include various other types of storage, processing, analysis, communication, event handling, visualization, and security services not illustrated).

In some embodiments, the provider network 100 may include a continuous protection data manager 112 configured to handle or manage backups of databases that are stored with or maintained by the database service 110. The backups may be maintained by one or more data storage services. The continuous data protection manager 112 may manage snapshots from the database service (e.g., in a native format illustrated as 145) as well as change log data (e.g., in a native format illustrated as 154) from the database service 110, in some embodiments. In at least some embodiments, a storage node may convert the change log data, from a format native to the database service to a non-native format, prior to providing the change log data to the continuous data protection manager 112 that stores the change log data 155 to change log archive 152.

As illustrated, the continuous data protection manager 112 includes a past-state backup generator 114 configured to perform at least some of the functionality described in FIGS. 3-5 and 8A-B. As described herein, the past-state backup generator 114 may provide a user interface 115 (e.g., illustrated in FIG. 7) the receives requests to generate a copy of a current database table as of a time in the past (e.g., as in FIG. 3, block 302) from a customer.

In some embodiments, the data storage services may include a snapshot data store 142 and a change log archive data store 152. The snapshot data store 142 may be configured to store complete backups of partitions (e.g., partitions 124A-N) of the database as of a point-in-time in the past. For example, a particular snapshot stored at the snapshot data store 142 may be generated as of a time in the past such that the data in the particular snapshot is at the state in which the database existed at that particular time in the past. In other embodiments, the database service 110 may be configured to store current or active data for the database such that data of the partition of the database is the most recent version of the data. The requested backups-in-the-past may be stored separate from the snapshots in the snapshot data store 142, in embodiments, in a backup data store 162 for example (illustrated in FIG. 2). The change log archive data store 152 may be configured to store logs indicating changes, mutations or events that occur with respect to the database or any data corresponding to the database managed by the database service 110.

In at least some embodiments, archives may be immutable. In some examples, immutable archived data may not be changed or edited, but only read or deleted. In some examples, archived snapshots or change log data may be not be changed or edited, but only read or deleted, in durable storage (e.g., storage service 290, illustrated in FIG. 2), for example.

In various embodiments, the components illustrated in FIG. 1 may be implemented directly within computer hardware, as instructions directly or indirectly executable by computer hardware (e.g., a microprocessor or computer system), or using a combination of these techniques. For example, the components of FIG. 1 may be implemented by a system that includes a number of computing nodes (or simply, nodes), in one embodiment, each of which may be similar to the computer system embodiment illustrated in FIG. 11 and described below. In one embodiment, the functionality of a given system or service component (e.g., a component of database service 110) may be implemented by a particular node or may be distributed across several nodes. In some embodiments, a given node may implement the functionality of more than one service system component (e.g., more than one data store component, such as snapshot data store 142 or change log archive 152).

Database service 110 may include various types of database services, in embodiments (e.g., relational and non-relational) for storing, querying, and updating data. Such services may be enterprise-class database systems that are highly scalable and extensible. In one embodiment, queries may be directed to a database in database service 110 that is distributed across multiple physical resources (e.g., computing nodes or database nodes), and the database system may be scaled up or down on an as needed basis. The database system may work effectively with database schemas of various types and/or organizations, in different embodiments. In one embodiment, clients/subscribers may submit queries in a number of ways, e.g., interactively via a SQL interface to the database system. In other embodiments, external applications and programs may submit queries using Open Database Connectivity (ODBC) and/or Java Database Connectivity (JDBC) driver interfaces to the database system. In one embodiment, database service 110 may also be any of various types of data processing services to perform different functions (e.g., query or other processing engines to perform functions such as anomaly detection, machine learning, data lookup, or any other type of data processing operation). Various other distributed processing architectures and techniques may be implemented by database service 110 (e.g., grid computing, sharding, distributed hashing, etc.) in another embodiment.

In one embodiment, clients 160 may encompass any type of client configurable to submit network-based requests to provider network 100 via network 170, including requests for database service 110 (e.g., to query a database managed by the database service 110) or data storage service(s) (e.g., a request to create, read, write, obtain, or modify data in data storage service(s), etc.). For example, in one embodiment a given client 160 may include a suitable version of a web browser, or may include a plug-in module or other type of code module configured to execute as an extension to or within an execution environment provided by a web browser. Alternatively, in a different embodiment, a client 160 may encompass an application such as a database application (or user interface thereof), a media application, an office application or any other application that may make use of storage resources in data storage service(s) to store and/or access the data to implement various applications. In one embodiment, such an application may include sufficient protocol support (e.g., for a suitable version of Hypertext Transfer Protocol (HTTP)) for generating and processing network-based services requests without necessarily implementing full browser support for all types of network-based data. That is, client 160 may be an application configured to interact directly with provider network 100, in one embodiment. In one embodiment, client 160 may be configured to generate network-based services requests according to a Representational State Transfer (REST)-style network-based services architecture, a document- or message-based network-based services architecture, or another suitable network-based services architecture.

In one embodiment, a client 160 may be configured to provide access to provider network 100 to other applications in a manner that is transparent to those applications. For example, client 160 may be configured to integrate with a database on database service 110. In such an embodiment, applications may not need to be modified to make use of the storage system service model. Instead, the details of interfacing to the database service 110 may be coordinated by client 160.

The clients 160 may communicate with the database service 110 from within the provider network 100, in some embodiments. For example, the clients 160 may be implemented on computing nodes of a computing service offered by the provider network 100. The clients 160 may convey network-based services requests to and receive responses from provider network 100 via network 170, in one embodiment. In one embodiment, network 170 may encompass any suitable combination of networking hardware and protocols necessary to establish network-based-based communications between clients 160 and provider network 100. For example, network 170 may encompass the various telecommunications networks and service providers that collectively implement the Internet. In one embodiment, network 170 may also include private networks such as local area networks (LANs) or wide area networks (WANs) as well as public or private wireless networks. For example, both a given client 160 and a provider network 100 may be respectively provisioned within enterprises having their own internal networks. In such an embodiment, network 170 may include the hardware (e.g., modems, routers, switches, load balancers, proxy servers, etc.) and software (e.g., protocol stacks, accounting software, firewall/security software, etc.) necessary to establish a networking link between given client 160 and the Internet as well as between the Internet and provider network 100. It is noted that in one embodiment, clients 160 may communicate with provider network 100 using a private network rather than the public Internet.

The clients 160 may send a request to perform an operation to respective databases managed by the database service 110. For example, a given client 160 may send a PUT (or SET) command and corresponding data to request that the data be stored in the database at the database service 110. In another example, a given client 160 may send a CHANGE (or UPDATE) command and corresponding data to request that some data existing in the database at the database service 110 be changed based on the sent data. In yet another example, a given client 160 may send a DELETE (or REMOVE) command and identify data to request that the data existing in the database at the database service 110 be deleted or removed from the database and the database service 110. In other embodiments, a given client 160 may provide another command to perform some operation to the data stored in the database at the database service 110.

The database service 110 may be configured to maintain a backup system for partitions (e.g., partitions 124A-N) of databases managed by the database service 110. In some embodiments, the backup system may perform backups for single partitions of the databases or single-partition databases. In other embodiments, the backup system may perform backups for multiple partitions of the databases. The backup system may include a continuous data protection manager 112 configured to manage change logs and backups or snapshots of partitions of the databases stored in storage services of the database service 110. The continuous data protection manager 112 may generate a complete backup of a partition of the database (e.g., a snapshot) by applying logs to a closest existing snapshot.

A periodicity at which the continuous data protection manager 112 generated backups may be based on the number of logs accumulated for the partition or table. Periodicity may be based on an amount of time, in some embodiments. In some embodiments the periodicity may be based on an amount of changes or a period of time between backups, whichever happens sooner.

A change log (e.g., change log data 154) may indicate one or more changes to the database over a period of time or sequence of events. For example, the change log (e.g., change log 154) may indicate that data was added, changed or deleted from the database in a period of time. The change log may be stored at a log store (e.g., change log data store 604 in FIG. 6, described below, or change log archive 152). The log store may be accessible to the database service 110 and the continuous data protection manager 112. In some embodiments, the database service 110 may generate or update a log segment in response to an event at the database. For example, the database service 110 may indicate in the log segment that the event occurred, and some data in the database has changed. The log segment may include metadata indicating a sequence start identifier, a sequence end identifier, a time start identifier, a time end identifier, one or more checksums, a previous cumulative size of the change log, a lineage of the log segment, or any combination thereof. The sequence start identifier may indicate a sequence number for a first event in a sequence of events that is logged in the log segment. The sequence end identifier may indicate a sequence number for a last event in the sequence of events that is logged in the log segment. The time start identifier may indicate a timestamp for the first event in the sequence of events that is logged in the log segment. The time end identifier may indicate a timestamp for the last event in the sequence of events that is logged in the log segment. The one or more checksums may correspond to the data in the partition of the database, the log segment, etc. The one or more checksums may be used by the continuous data protection manager 112 or the database service 110 to determine whether application of at least a portion of the log segment or the change log to the database has resulted in the correct data being restored or retrieved. The previous cumulative size of the change log may indicate a size of the change log prior to the respective log segment. The lineage of the log segment may indicate parent or child partitions associated with the log segment.

The log segment may be added to the change log in response to satisfying one or more criteria. In some embodiments, the log segment may be added to the change log based on a determination that the log segment satisfies a size threshold. For example, the database service 110 may add events to the log segment continuously until the log segment reaches a specified size or a size limit. After the log segment is the specified size, the log segment may be committed to the change log. In other embodiments, the log segment may be added to the change log based on a determination that a number of operations tracked or identified in the log segment satisfies a threshold number of operations. For example, the database service 110 may perform multiple CHANGE operations to the database. The multiple CHANGE operations on a data entry may require a higher amount of storage space in the log segment despite the storage space used by the data entry has not significantly increased. The database service 110 may track a number of operations and corresponding types and save the number of operations and corresponding types to the log segment.

The database service 110 may receive an indication that an event has occurred with a partition of a given database managed by the database service 110. In some embodiments, the event may be based on a request to perform an operation sent from a given client 160 to the database service 110. For example, the event may be based on a PUT command, a CHANGE command, a DELETE command or any other type of request from the given client 160. The event may also indicate a type of the operation, such as PUT, CHANGE, DELETE, etc. The event may also indicate data that used to perform the operation. For example, the indicated data may include new data to be stored with the PUT command, changed data to be updated with the CHANGE command, data to be deleted with the DELETE command.

The clients 160 may send a request to the database service 110 to generate a backup of a partition of a database (e.g., a current backup or a backup of a database as of a time in the past). The database service 110 may also implement timed, periodic or continuous backups automatically or after scheduling by the clients 160. In some embodiments, a backup of the partition the database (e.g., a snapshot) may be generated at least in part by the continuous data protection manager 112. The continuous data protection manager 112 may have access to the database stored at the database service 110, the snapshot data store 142 and the change log archive 152.

In an example, the continuous data protection manager 112 may determine that the snapshot type is a log-based snapshot. The continuous data protection manager 112 may generate data that indicates a point in the change log that, when used in conjunction with a stored snapshot, may be used to represent a snapshot of the partition of the database. The continuous data protection manager 112 may store the generated data as metadata in the snapshot data store 142.

In some embodiments, the log-based snapshot may be used to generate a full snapshot based on applying at least a portion the change log to a stored snapshot. The log-based snapshot may indicate the portion of the change log that may include logged events that have occurred since generation of the stored snapshot through the current time. The continuous data protection manager 112 may retrieve the stored snapshot from the snapshot data store 142, such as by sending a request to the snapshot data store 142 for the previous snapshot. The continuous data protection manager 112 may retrieve the change log from the change log archive 152, such as by sending a request to the change log archive 152 for the change log. The continuous data protection manager 112 may be configured to apply the change log to the stored snapshot. In some embodiments, applying the change log to the stored snapshot includes starting with the stored snapshot and stepping through the change log and reenacting events included in the change log in chronological order to the stored snapshot. In other embodiments, applying the change log to the stored snapshot includes starting with the stored snapshot and stepping through the change log and undoing events included in the change log in reverse chronological order.

In at least the embodiment illustrated in FIG. 1, the system may instruct components of the system (e.g., forward/reverse converter 206 in FIG. 2, described below) to convert partition data in a native format to a preferred format (e.g., a binary and text interchangeable format, a typed JSON-superset, etc.) and then persist the preferred format to backup storage (e.g., snapshot data store 142) distinct from the source storage system (e.g., database service 110). In embodiments, the conversion from the service or native format is not done directly into the preferred format. In some embodiments the native format is converted to an intermediate model (e.g., a Java data type) first and then serialized into the preferred format.

Figure 2:
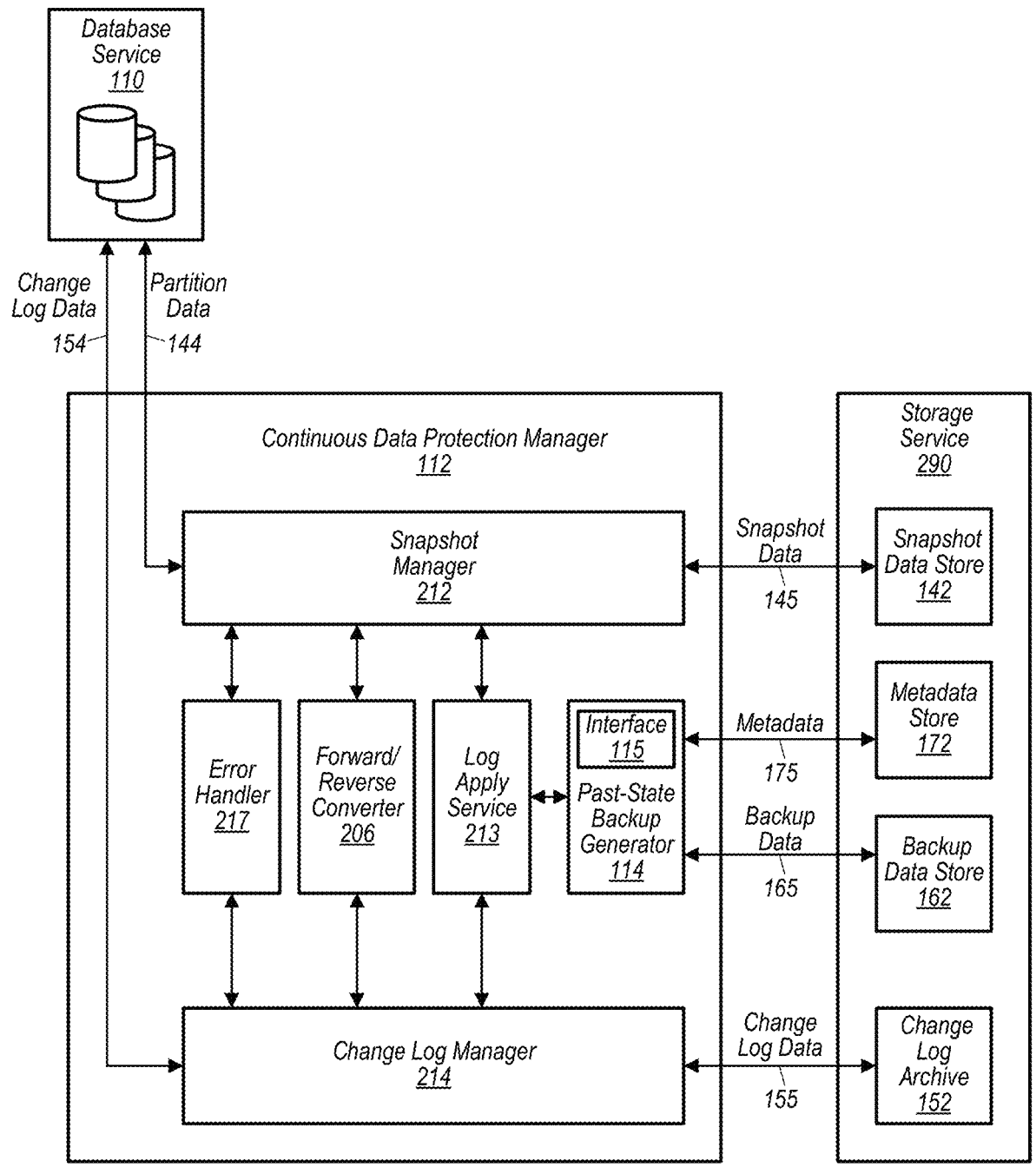
FIG. 2 is a data flow diagram illustrating logical relationships between components of a continuous data protection manager of a continuous data protection system, according to some embodiments.
Figure 3:
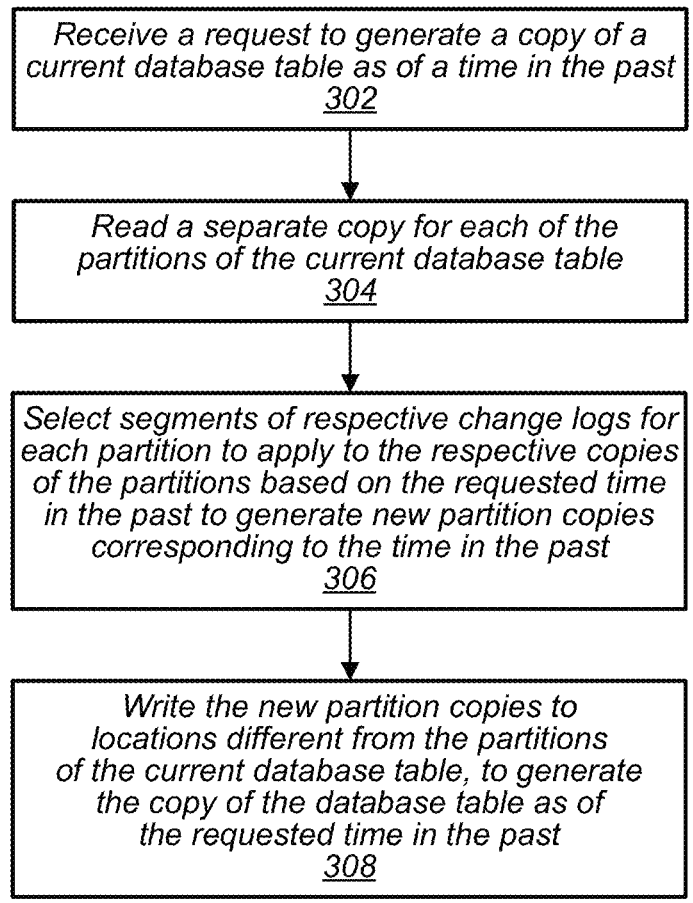
FIG. 3 is a flow chart illustrating a technique for generating backups of current database tables as of a time in the past, according to some embodiments.

FIG. 2 is a data flow diagram illustrating logical relationships between components of a continuous data protection manager of a continuous data protection system that supports generation of backups in the past, according to some embodiments. The snapshot manager 212, and a change log manager 214 depicted in FIG. 2 illustrate components of the continuous data protection manager 112 also depicted in FIG. 1. These managers, in combination with the other depicted components may perform one or more of the steps of the processes illustrated in FIGS. 3-5 and 8A-B, in embodiments. Different components (e.g., illustrated or non-illustrated components) may perform various of the steps, in various embodiments, without departing from the scope of this disclosure. FIG. 3 is a flow chart illustrating a technique for generating backups of current database tables as of a time in the past, according to some embodiments. The functionality illustrated in FIG. 3 may be performed by one or more of the components illustrated in FIG. 2 (and also by components in FIGS. 1, 2, 6, 7, 9 and 11, in embodiments). However, the steps illustrated in FIG. 3 may be performed by other various components of the systems described herein, or by components not illustrated herein, in some embodiments, without departing from the scope of this disclosure.

The past-state backup generator 114 of continuous data protection manager 112 may direct or control other components to perform various of the functions illustrated in FIG. 3. For instance, the past-state backup generator 114 may receive (via interface 115) a request to generate a copy of a current database table as of a time in the past (FIG. 3, block 302). The request may be received via various types of interfaces, such as via an API and/or via a graphical user interface, such as the console illustrated in FIG. 7). Subsequent to receiving the request (e.g., after responding to the request with an acknowledgement that the copy has been generated) separate copies for each of the partitions of the current database table are read (FIG. 3, block 304), for example, by the snapshot manager 212 at the direction of the log apply service 213, triggered by the past-state backup generator 114.

Segments of respective change logs are selected for each partition to be applied to the respective copies of the partitions based on the requested time in the past to generate new partition copies corresponding to the time in the past (FIG. 3, block 306). For instance, the log apply service 213, at the direction of the past-state backup generator 114 may instruct the log apply service to apply logs to the snapshots and the change log manager 214 may respond by obtaining the segments from change log archive 15, by obtaining the corresponding snapshots via snapshot manager 212 and by Applying the obtained change logs to the obtained snapshots to generate the new partition copies. The new partition copies are written to locations different from the partitions of the current database table (FIG. 3, block 308). For instance, past-state backup generator 114 may write the new partition copies to backup data store 162, or the snapshot manager 212 may be directed to write the new copies to snapshot data store 142.

Figure 4:
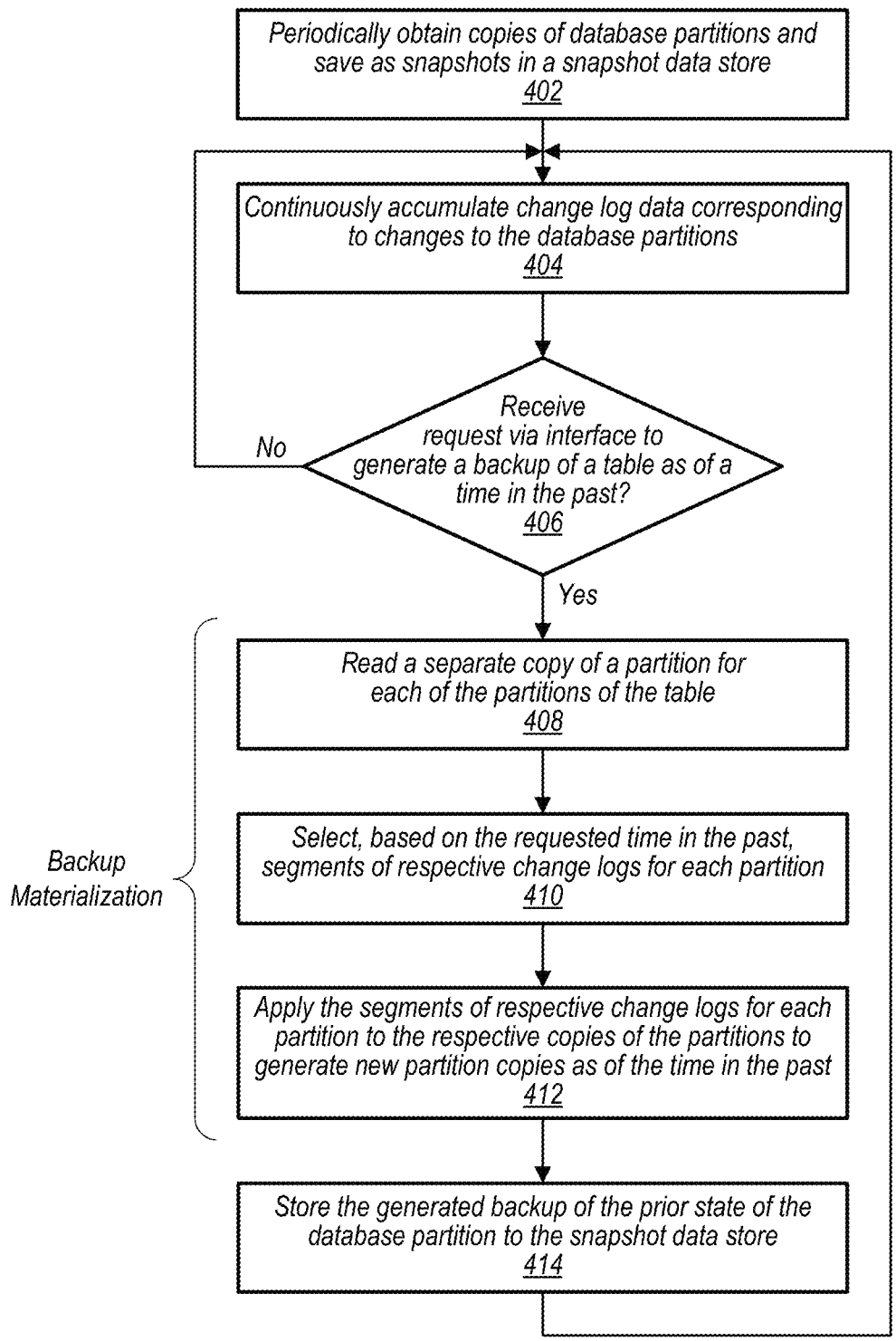
FIG. 4 is a flow chart illustrating a technique for generating backups of current database tables as of a time in the past, according to some embodiments.

FIG. 4 is a flow chart illustrating a technique for generating backups of current database tables as of a time in the past, according to some embodiments. FIG. 4 illustrates, in addition to materialization of the requested backup-in-the-past, one technique for creating the data used to generate the requested backup-in-the-past. Components of the continuous data protection manager 112 illustrated in FIG. 2 perform some of the features described in FIG. 4, in embodiments. However, the steps illustrated in FIG. 4 may be performed by other various components of the systems described herein, or by components not illustrated herein, in some embodiments, without departing from the scope of this disclosure.

In embodiments of the disclosed system, an initial copy of a database partition is obtained and saved as a snapshot in a snapshot data store. For example, in at least the illustrated embodiment of FIG. 2, continuous data protection manager 112 receives partition data 145 (e.g., in a format native to the database), for example, obtaining a copy (e.g., a full partition snapshot). The copy may be from a scan 144 of one or more of the partitions 124A-N or an export of a replica of the database partition, for example. The snapshot manager 212 may store the initial copy of the partition data (e.g., from a replica) in a format native to the database to a data store (e.g., snapshot data store 142 in storage service 290).

In some embodiments, the continuous data protection manager may direct a process external to the continuous data protection manager (e.g., a database service process) to obtain a copy of the database partition and to store the copy to durable storage (e.g., in either of a native or non-native format).

In some embodiments, the snapshot may be converted from a native format to a non-native format. In an example, forward/reverse converter 206 may convert the initial copy of the partition data stored in snapshot data store 142 into a snapshot in a non-native format 145, for example, forward converting each item of the full partition snapshot to a non-native format, and then store the converted items to durable storage (e.g., to snapshot data store 142, or another data store distinct from snapshot data store 142) as partition snapshot data in a non-native format. In some such embodiments, the durable storage may be used at part of a transport mechanism to transport snapshots obtained in a native format to the continuous data protection manger 112 in a non-native format, with the native format snapshots being deleted from durable storage subsequent to conversion. In at least some embodiments, forward/reverse conversion may be performed by a forward/reverse converter process of the database service that is not part of the continuous data protection manager 112.

In embodiments, the conversion process may include forward transforming the replica from the native format into an intermediate object (e.g., an intermediate JAVA based record) to represent the data in-memory (an in-memory representation) before continuing to transform the native-format record to the non-native format.

In embodiments, a non-native format may be a format that provides dual-format interoperability (e.g., applications can seamlessly consume the data in either its text or binary forms without loss of data fidelity) which enables users to take advantage of the ease of use of a text format while capitalizing on the efficiency of a binary format. For example, some forms of dual-format interoperability make the text form easy to prototype, test, and debug, while the binary format saves space and parsing effort.

A non-native format may include a rich type system, e.g., extending JSON's type system, adding support for types suitable for a wider variety of uses, including precision-sensitive applications and portability across languages and runtimes, in some embodiments. In addition to strings, Booleans, arrays (e.g., lists), objects (e.g., structs), and nulls, the non-native format may add support for arbitrary-precision timestamps, embedded binary values, and symbolic expressions. Some embodiments of a non-native format may expand JSON's number specifications by defining distinct types for arbitrary-size integers, IEEE-754 binary floating-point numbers, and infinite-precision decimals.

A non-native format may include Ion, a richly-typed, self-describing, hierarchical data serialization format that provides interchangeable binary and text representations, in embodiments.

In some embodiments, a non-native format is a self-describing format, giving its readers and writers the flexibility to exchange data without needing to agree on a schema in advance. For example, in some embodiments, a self-describing format may not require external metadata (i.e. a schema) in order to interpret the structural characteristics of data denoted by the format. For example, the payloads of the self-describing format may be free from build-time binding that inhibits independent innovation and evolution across service boundaries (data may be sparsely encoded and the implicit schema may be changed without explicit renegotiation of the schema among all consumers).

Continuing with FIGS. 2 and 4, copies of database partitions are periodically obtained (e.g., via the log apply functionality, as described above) and saved as snapshots 145 in a snapshot data store (block 402). For example, the snapshot manager 212 may periodically obtain the copies. In some embodiments, copies of the metadata 175 for the database table may also be obtained at this point, and stored to metadata store 172.

Change log data corresponding to changes to the database partitions is continuously accumulated (block 404). For example, the accumulation of the change log data may continue during other steps such as any or all of steps 406-414. Change log storage may include any one of the database service 110, or a change log data store 604 (FIG. 6, described below) may accumulate the change log data, or the change log data may be accumulated to durable storage (e.g., change log archive 152 of storage service 290). The change log data may be accumulated in a format native to the database from which the change log data is obtained, or may be converted into a non-native format prior to accumulation, in various embodiments. In some embodiments, the change log data may be accumulated in a process that continues during one or more of the other steps of the process. In some embodiments, changes to the metadata for the database table may also be accumulated, and stored to metadata store 172.

Block 406 illustrates that if no request is received (no), the system continues accumulating change logs (periodic snapshots are obtained periodically, too, in embodiments), but if a request is received (yes) via an interface to generate a backup of a table as of a time in the past, the process continues to a backup materialization phase (blocks 408-412, similar in some respects to blocks 304-308) in at least the illustrated embodiment. A separate copy of a partition is read for each of the partitions of the table (block 408). Segments of respective change logs are selected based on the requested time in the past (block 410). The segments for each partition are log-applied to the respective copies (e.g., snapshots) of the partitions to generate new partition copies as of the time in the past. The generated new partition copies (e.g., backup data 165, in embodiments) of the prior state of the database partition (e.g., as of the time in the past) are stored to a data store (e.g., backup data store 162, snapshot data store 142, etc.).

In embodiments, when a backup is triggered, a previous snapshot of the database partition may be accessed from the snapshot data store 142, by the snapshot manager 212, for example. In some embodiments, instead of using a previous snapshot of the database partition (e.g., from durable storage), the system may obtain a copy of the database partition (e.g., from a replica of the partition). Changes from the accumulated change log since the previous snapshot was created may be applied to the previous snapshot to generate a new snapshot of the database partition. For instance, the snapshot manager 212 may call the log apply service 213 to apply the accumulated change log. Log-apply may sometimes be referred to herein as materialization. Materialization may include obtaining with one or more snapshots, applying the corresponding logs, and creating a coherent set of artifacts that represent the requested backup, for example. The results of materialization may be put directly into a database service table or a materialized set of artifacts may be stored to durable storage, in embodiments.

The snapshot manager 212 may store the new snapshot to the snapshot data store 142. The system may return to accumulating change log data in at least the illustrated embodiment. In some embodiments, accumulation may not be interrupted, and continues as a parallel process.

In some embodiments, a first copy or a snapshot of a partition is stored to durable storage (e.g., snapshot datastore 142) and change log data (e.g., from the database service) may be continuously archived (e.g., to change log archive 152) to durable storage. At some point, (e.g., when the change log archive gets to a certain size threshold, or some time threshold) the change log data is downloaded from the archive and used (e.g., via a log apply function) to generate a new snapshot, based on the first snapshot. This process may iterate, at least as long as changes are being made to the partition or database, for example.

In at least the illustrated embodiments, either of snapshot manager 212 or change log manager 214 may call an error handler 217 to trigger any of various error routines such as retrying the conversion/reverse-conversion process, retrying the process using a different partition replica, retrying the process on different host machine, reporting failure, flagging the error and continuing, etc.

In at least the illustrated embodiments, a checksum generator (not illustrated) may generate a checksum on the snapshot in the non-native format prior to upload of the snapshot to the snapshot data store 142. In embodiments, the uploaded data may also be processed with a streaming checksum. In some embodiments, the checksum is performed after the upload is complete. The checksum may help protect integrity of the overall process while uploading the output file to storage, in embodiments. Some such features are useful when the entire data set cannot fit into memory (e.g., partitions).

Figure 5:
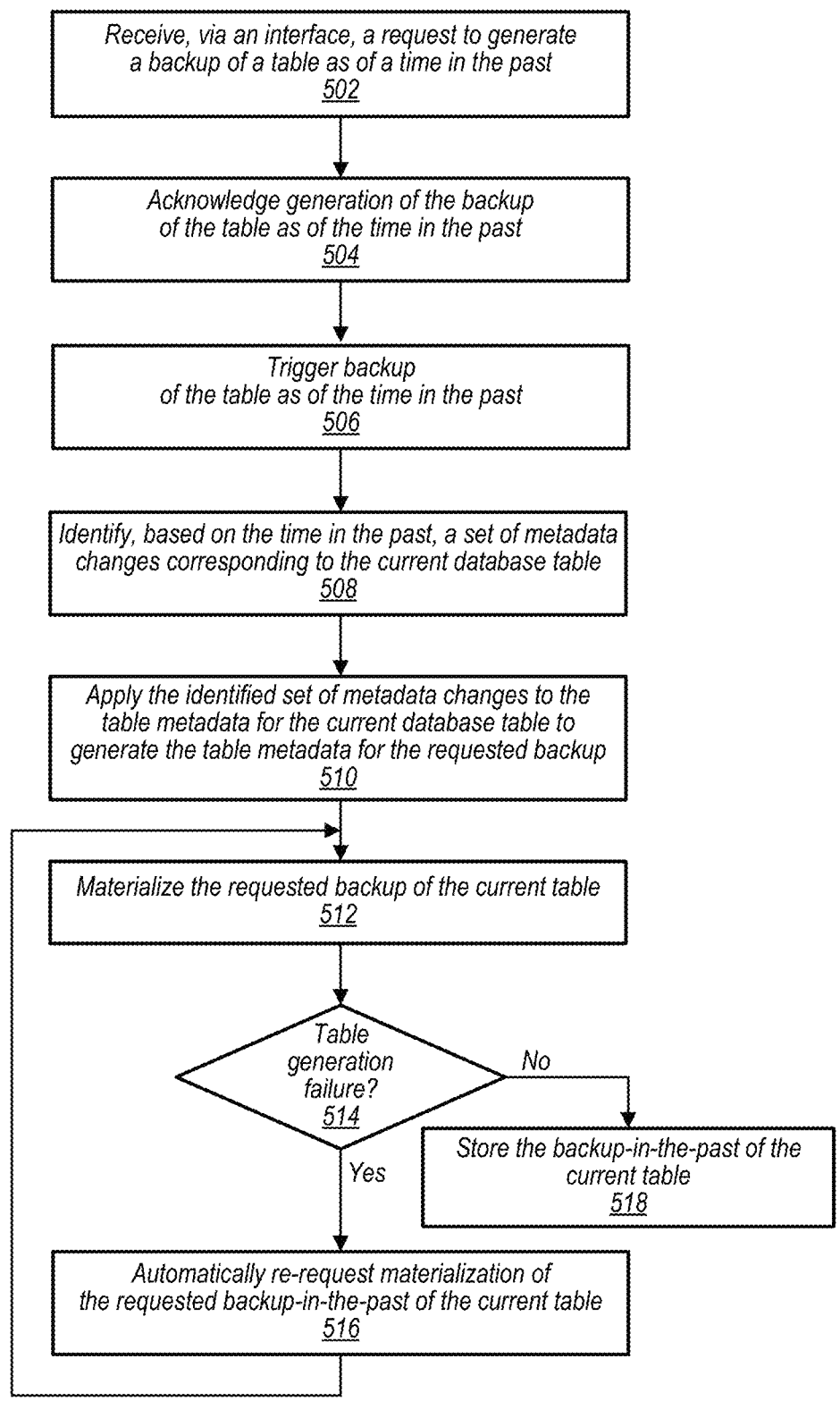
FIG. 5 is a flow chart illustrating a technique for generating backups of current database tables as of a time in the past, according to some embodiments.

FIG. 5 is a flow chart illustrating a technique for generating backups of current database tables as of a time in the past, according to some embodiments. In particular, FIG. 5 illustrates features such as timing of an acknowledgement, how metadata for the backup-in-the-past may be obtained, and an automatic re-request of backups. Some or all of these features may be performed by various components of the continuous data protection manager 112 in FIGS. 1 and 2, for example. However, the steps illustrated in FIG. 5 may be performed by other various components of the systems described herein, or by components not illustrated herein, in some embodiments, without departing from the scope of this disclosure.

Figure 7:
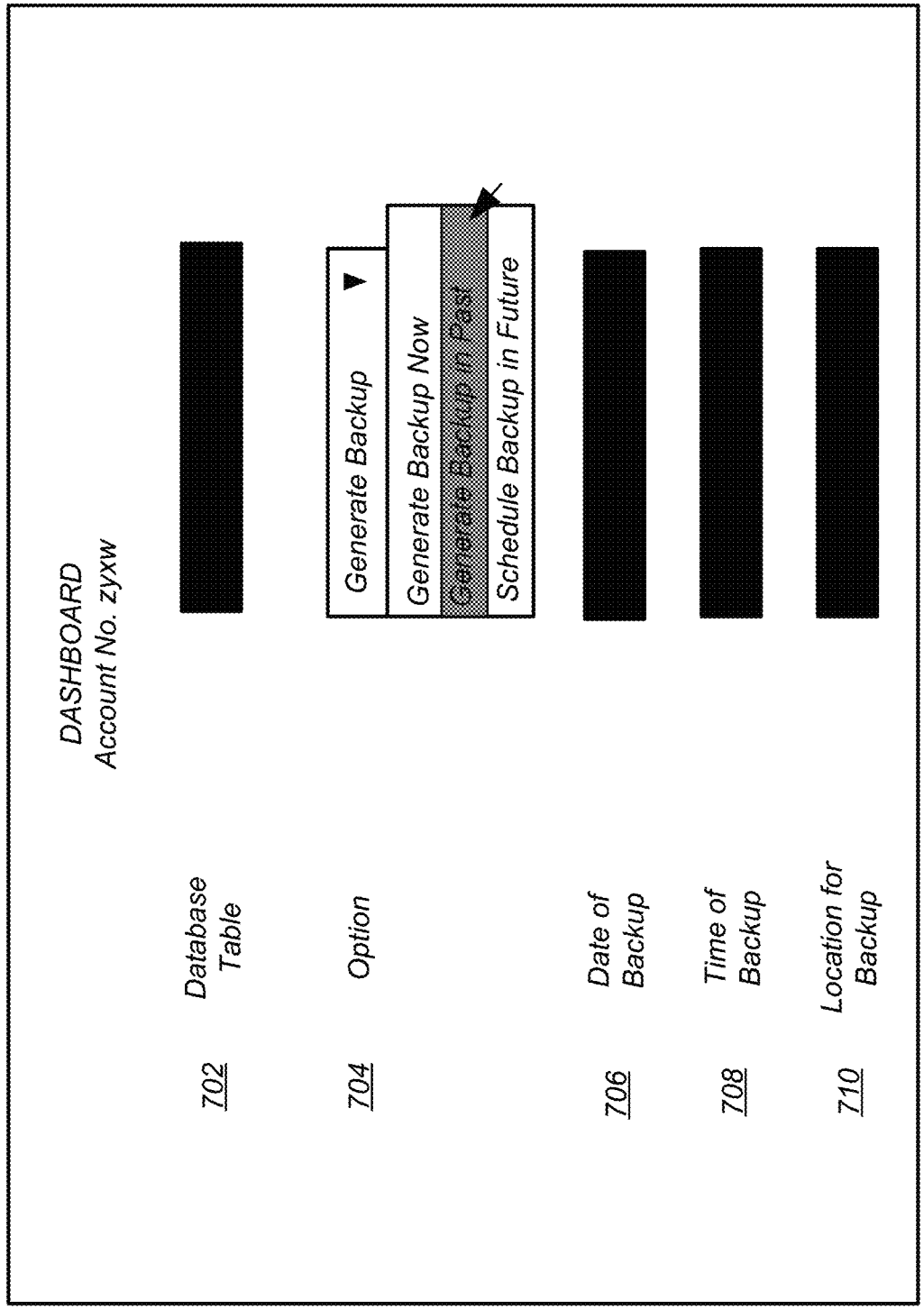
FIG. 7 illustrates a dashboard interface for requesting backups of current database tables as of a time in the past from a continuous data protection system, according to some embodiments.

At block 502, a request to generate a backup of a table as of a time in the past is received via an interface. For example, FIG. 7 illustrates an example interface 115 that provide selectable user interface elements for specifying the requested backup. Block 504 illustrates acknowledgement of the generation of the backup of the table as of the time in the past. In at least the illustrated embodiment, the acknowledgement may be provided prior to materialization of the backup. This relatively quick response may be an unexpected result, especially for clients requesting backup of a large database table at least because a scanning-type backup of a large database table—a prior way of performing a backup of an entire table—takes a relatively longer amount of time to complete. The system may be able to respond with the acknowledgement of success prior to performing the backup because the system has all the data it needs to create the backup, in embodiments. For example, a combination of existing snapshots and change log data may be used to generate the requested backup-in-the-past after the confirmation of success has been sent. Some such workflows may be beneficial for a variety of scenarios, such as, but not limited to, creation of compliance backups that are required on some schedule, but are not necessarily used right away, for example. In embodiments, the system may obtain metadata for the backup-in-the-past and/or schedule materialization prior to providing the acknowledgement.

Figure 8A:
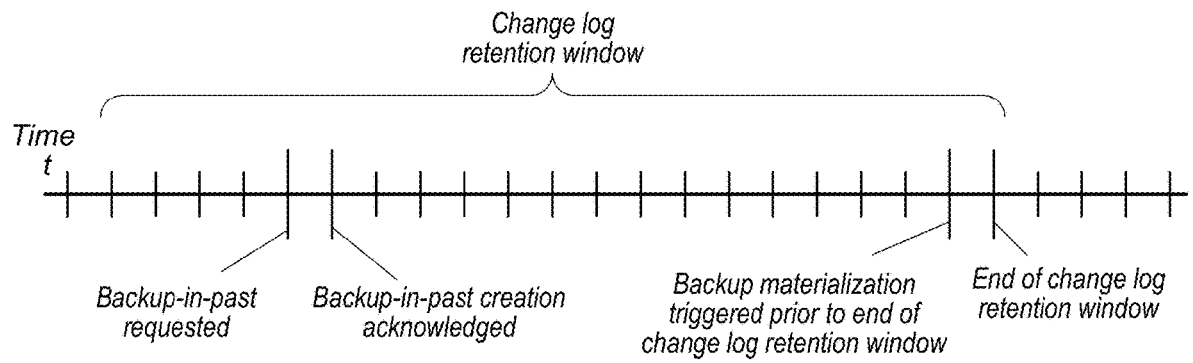
FIGS. 8A and 8B illustrate a time line associated with a change log retention window and a process diagram illustrating a technique for triggering materialization of a backup based on the window, according to some embodiments.
Figure 8B:
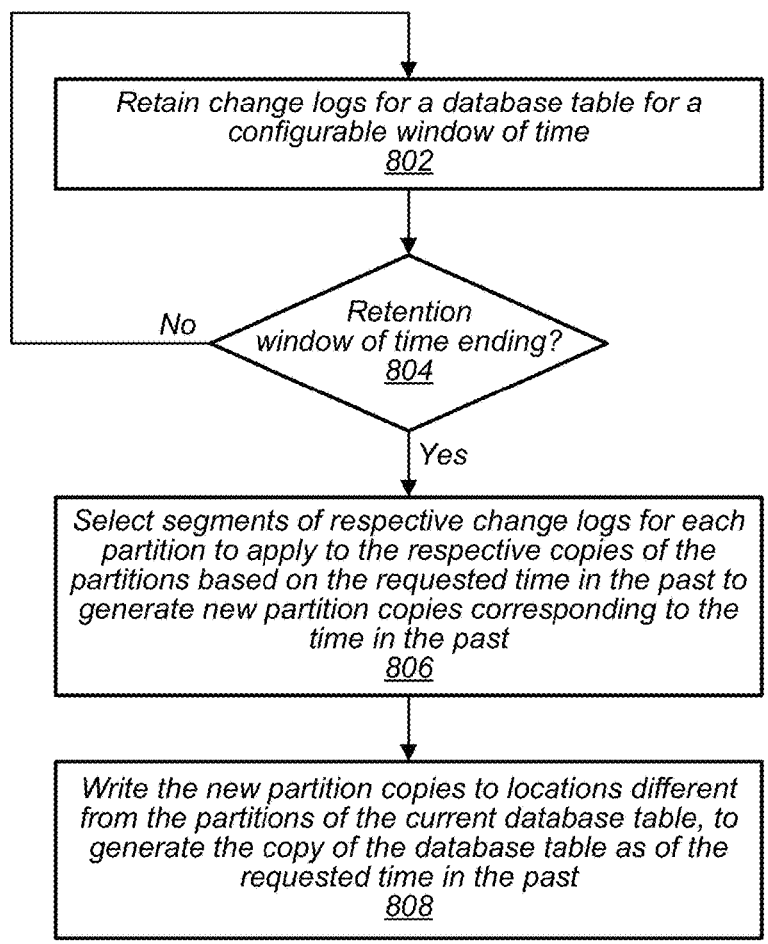

Block 506 illustrates that materialization is triggered. In embodiments, materialization is not always triggered immediately (although it could be, in embodiments). It may be made for compliance reasons instead of for use, for example. In some such cases, materialization of the backup may be postponed until a time when resources are more readily available to perform the materialization, until a particular type of resource becomes available, or dependent upon an expiration of a storage retention period of time for the data required to generate the backup (e.g., a data retention expiration for the snapshots and change logs used to create the backup-in-the-past). FIGS. 8A-B illustrate such an embodiment, for instance.

At block 508, a set of metadata changes corresponding to the current database table, based on the time in the past, are identified. For instance, the past-state backup generator 114 may identify the changes stored in metadata store 172. In some embodiments, the changes to the metadata for the table may be obtained from database service 110. The identified set of metadata changes are applied to the table metadata for the current database table to generate the table metadata for the requested backup (block 510). The generated table metadata for the backup-in-the-past may be used to create the backup and may be stored with the backup (e.g., at the backup data store 162). The generated table metadata for the backup-in-the-past may be used in the materialization of the table partitions, in embodiments. At block 512, the requested backup of the current table is materialized. For instance, a process similar to that illustrated in FIG. 3 (items 304-308) or 4 (block 408-412) may be performed to materialize the requested backup-in-the-past.

Block 514 illustrates that the table generation process may fail. For example, failures may be experiences at any of the steps illustrated in blocks 302-308 or 402-414, or 502-512. In the illustrated embodiment, if there is not a failure (no, block 518)), the backup-in-the-past of the current table is stored (e.g., to backup data store 162, or to snapshot data store 142 or elsewhere). Otherwise, if there is a failure (yes) the system may continue without generating the backup (not illustrated) or may automatically re-request materialization of the requested backup-in-the-past of the current table (block 516). The process then returns to block 512 (materialization).

In a separate but related embodiment, the system may provide functionality that automatically responds to failure of a scheduled backup (not a backup-in-the-past) by automatically requesting generation of a backup-in-the-past for the failed backup at the time (now in the past) for the failed scheduled backup.

Figure 6:
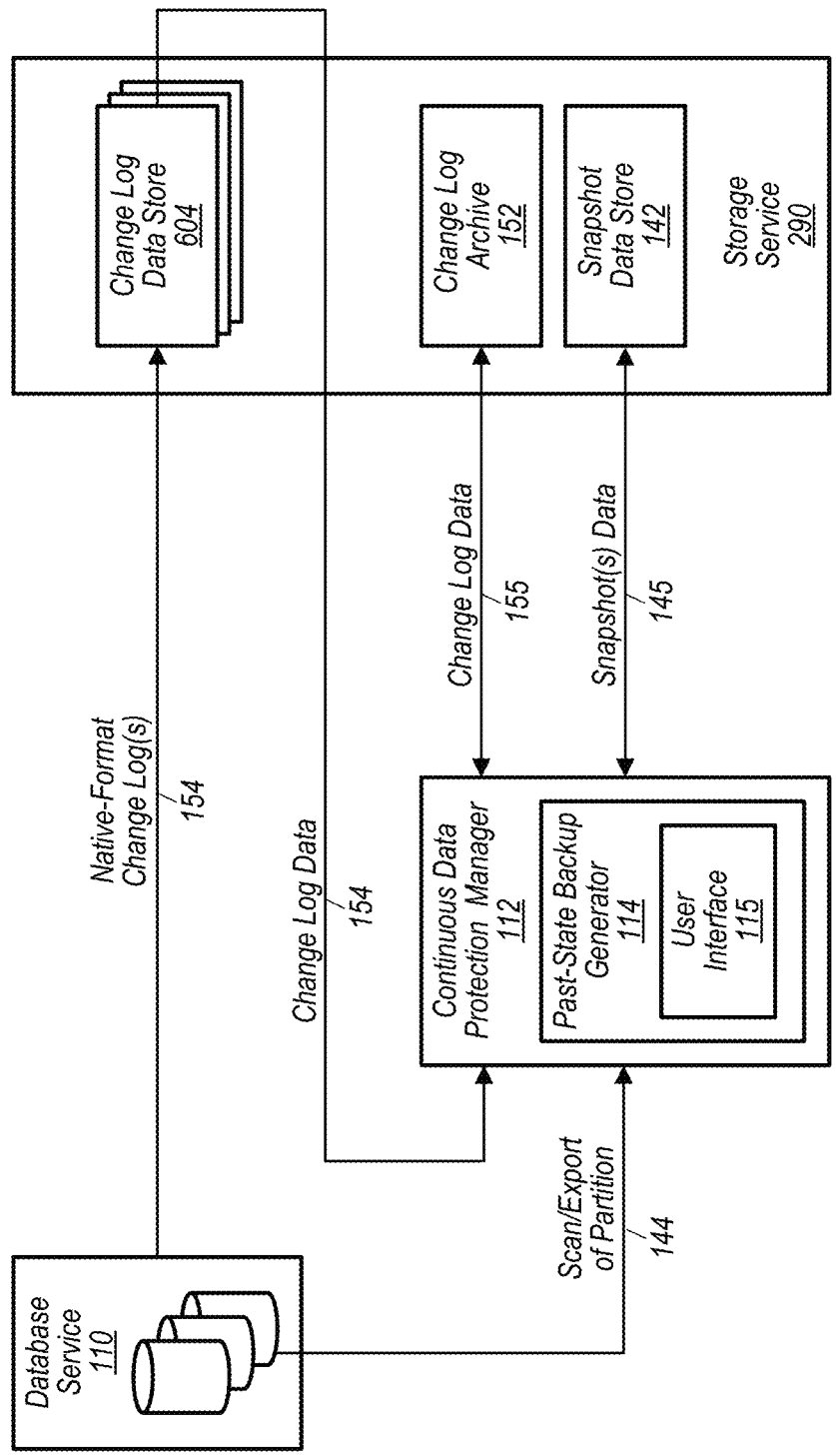
FIG. 6 is a data flow diagram illustrating data flows of a continuous data protection system with a past-state backup generator and a streaming data service, according to some embodiments.

FIG. 6 is a data flow diagram illustrating data flows of a continuous data protection system with a past-state backup generator and a streaming data service, according to some embodiments. In at least the illustrated embodiment, the system has already obtained initial copies of the partitions and accumulated changes log data, as described above. In some embodiments, the illustrated components may perform one or more of the steps depicted in FIGS. 3-5, 8A-B and 10. Other components may perform the steps, in embodiments.

Illustrated is a database service 110, change log data store 604, change log archive 152, and snapshot data store 142, in storage service 290. Various components of the continuous data protection manager 112 may direct data transfers as described herein. The change log data store 604 may be implemented as a real-time streaming data service, in embodiments. A streaming data service may enable processing and analyzing data (e.g., change log data 154) as it arrives, and responding instantly instead of having to wait until all data is collected before the processing can begin, in embodiments. Various components of continuous data protection manager 112 may obtain and/or write the change data 155 (in native or non-native format), and/or the snapshot data 845 (in native or non-native format) from/to the storage service 290. Backup data 865 may be stored to snapshot data store 142, in embodiments.

FIG. 7 illustrates a dashboard interface 115 for requesting backups of current database tables as of a time in the past from a continuous data protection system, according to some embodiments. Other types of interface are contemplated without departing from the scope of the disclosure (e.g., API, command line, etc.). In at least the illustrated embodiment, a graphical user interface (GUI) dashboard (a GUI provided by a service provider for customers to access features of the service provided by the service provider, in embodiments) includes user interface elements for specifying characteristics of a backup request.

The GUI illustrated in FIG. 7 is illustrated with user interface elements for (702) specifying the database table (the example provided is a customer's website metrics database table), for (704) specifying the backup type (on-demand, backup-in-the-past, or a scheduled backup-in-the-future), for (706) specifying the date of the backup, for (708) specifying the time of the backup, and for (710) specifying the location for storing the backup. The date and time specified via the dashboard in FIG. 7 may be the date and time in the past for the backup of the current database table as of the time in the past. Other types of user interface elements, for specifying characteristics associated with the backup-in-the-past are contemplated without departing from the scope of the disclosure.

FIGS. 8A and 8B illustrate a time line associated with a change log retention window and a process diagram illustrating a technique for triggering materialization of a backup based on the window, according to some embodiments. The illustrated features may be implemented by one or more components of the continuous data protection manager 112 in FIGS. 1, 2, 6, and 9. For example, FIG. 8A illustrates a timeline starting at time t and extending past a change log retention window that ends at the end of the change log retention window. FIG. 8A illustrates that a backup-in-the-past is requested earlier in the timeline, that the request is relatively quickly acknowledged, but that the materialization of the backup is triggered later in time, closer in time to the end of the change log retention window.

In embodiments, the system may determine if it is a more efficient use of space to retain the corresponding snapshots and change logs past the expiration of the retention window or instead to create corresponding backups and no longer retain the snapshots and change logs. For instance, the system may identify a first amount of storage space associated with storing the snapshots and corresponding change logs, and identify a second amount of storage space associated with storing backups instead of the snapshots and corresponding change logs. The system may compare the first amount of storage space and the second amount of storage space to determine which is a more efficient use of resources and transmit a recommendation to store either the backups, or the snapshots and corresponding change logs. The system may, responsive to acceptance of the recommendation, cause either the backups, or the snapshots and corresponding change logs to be archived for a period of time beyond the initial time window, for example.

FIG. 8B illustrates that the time at which materialization is triggered may depend upon the end of the retention window. Change logs for a database table are retained for a configurable amount of time (block 802). The retention time may or may not apply to the corresponding snapshots, in embodiments. An administrator or a customer may configure the amount of time via a console user interface element, for example, although a default may be specified by the system. Decision diamond 804 illustrates that the system determines whether the retention window of time is expiring. If not (no), the system continues to retain the change logs (and corresponding snapshots, in embodiments). If so (yes), segments of respective change logs for each partition to apply to the respective copies of the partitions based on the requested time in the past to generate new partition copies corresponding to the time in the past (block 806). The new partition copies are written to locations different from the partitions of the current database table to generate the copy of the database table as of the requested time in the past (block 808). The memory for the change log and/or partitions may be made available, in embodiments.

In embodiments, changes to the retention window may cause materialization of the requested backup-in-the-past to be performed at a different time, based on the changed retention window. For instance, configuring the window to be a longer period of time will cause materialization to be performed later, while configuring window to be a shorter period of time will cause materialization to be performed earlier, in embodiments.

Figure 9:
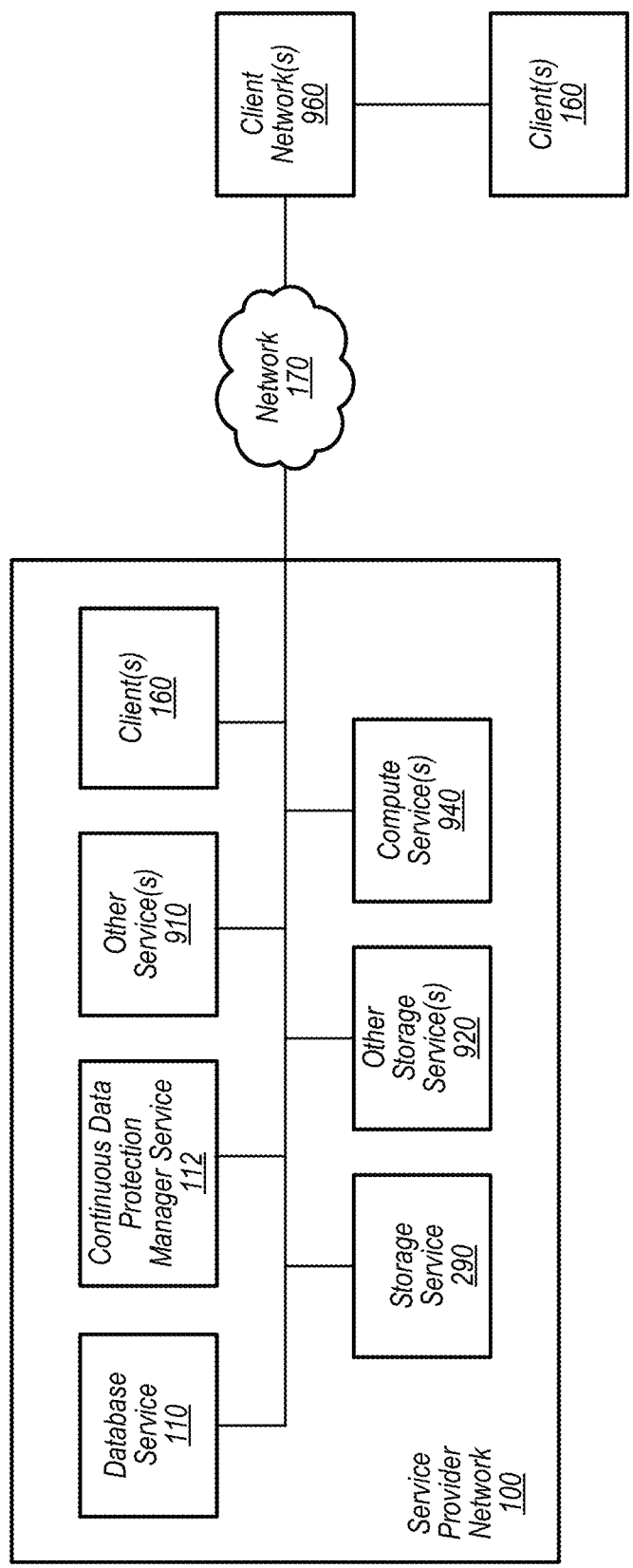
FIG. 9 is a block diagram of a continuous data protection manager service that carries out generation of backups of current database tables as of a time in the past in the context of a service provider network, according to some embodiments.

FIG. 9 is a block diagram of a continuous data protection manager service that carries out generation of backups of current database tables as of a time in the past in the context of a service provider network, according to some embodiments. Depicted is a continuous data protection manager service 112 similar to those illustrated in FIGS. 1 and 2, that may perform some of the steps illustrated in at least FIGS. 3, 4 and 8A-B. The continuous data protection manager service 112 is illustrated as part of service provider network 100 that includes database service 110, storage service 290, compute service 940, clients 160 as well as other storage services 920 and other services 910. In at least the illustrated embodiment, the service provider network 100 is communicatively coupled to client networks 960 and clients 160 via network 170. Service provider network 100 may provide one or more services to a plurality of distinct customers, each distinct customer comprising a distinct customer network. One or more of the components in FIG. 9 may be implemented by one or more of the computing nodes 1100 illustrated in FIG. 11.

It is contemplated that, in some embodiments of the processes illustrated herein, independent partition copies are coalesced into a coherent backup copy of a table as of the time in the past.

In some embodiments, a backup may be deleted, overwritten or otherwise removed from the system without ever being materialized. For instance, a backup may be requested and deleted, without being exported or used in a restore, and without the backup ever being materialized, in at least some embodiments.

In embodiments, the generated backup table may have a different partitioning than the prior table. Partitions may be merged or split for example.

Some embodiments, herein, describe techniques that operate on distinct partitions of a table at distinct times. For example, a first partition of a table (e.g., a relatively active table) may accumulate changes to the first partition in a change log more quickly than a second partition accumulates changes to the second partition, and the system may dynamically respond to each of those partitions differently, by performing updates to snapshots or producing backups of the more active partition more often and at different times from updates or backups of the less-active second partition of the same table.

In at least the illustrated embodiment, a technique for producing backup-in-the-past for an entire table that includes a number of distinct partitions that each have updated snapshots or backups at distinct times, is disclosed. In some embodiments where distinct partitions of a table have durably-stored snapshots that were generated at distinct times from one another, the system may use a log-apply service to apply logs for the respective partitions to the corresponding snapshots to bring the state of the data for each partition to a common point-in-time—an aligned-in-time set of snapshots for the partitions of the table.

Figure 10:
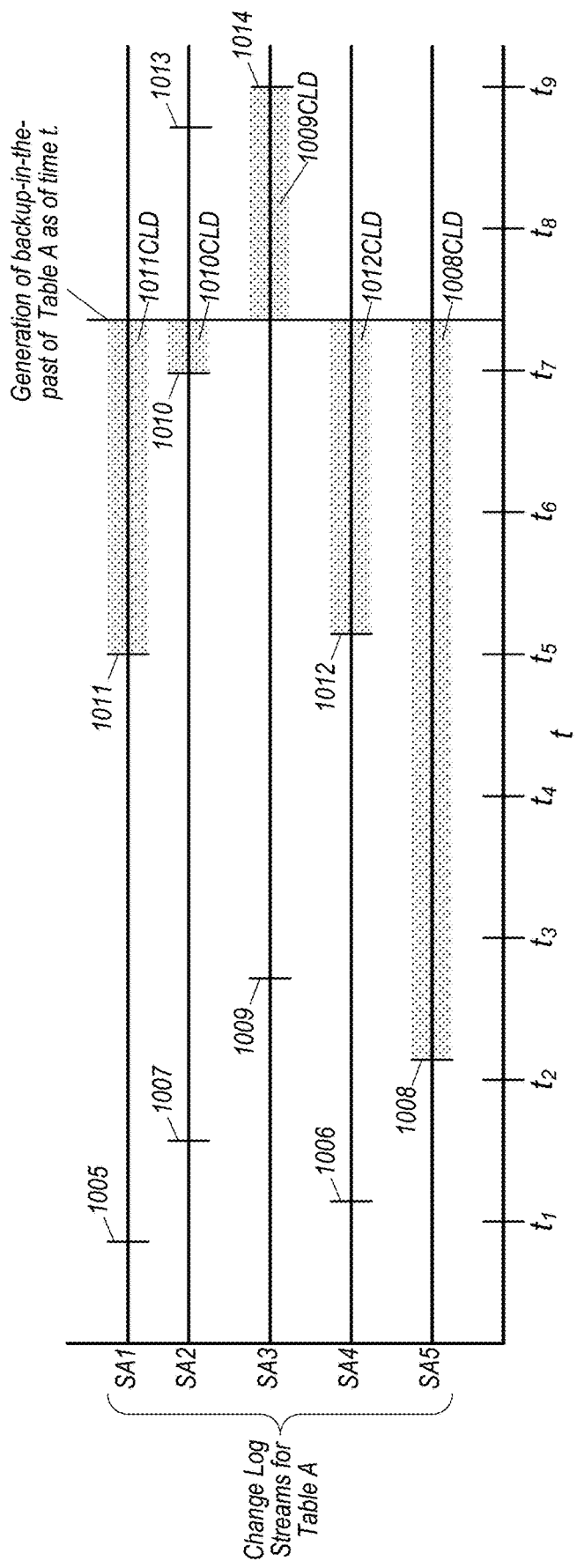
FIG. 10 is a chart illustrating creation of a backup in the past of a database table from snapshots and change logs streams of a table, according to some embodiments.

FIG. 10 illustrates, among other things, timing characteristics associated with change log streams of a system that implement the techniques described herein, in embodiments. For example, the illustrated example of change log streams for table A depict five change log streams (SA1-SA5) with snapshots 1005-1014 taken at various times t. Also illustrated is a target time of a requested backup-in-the-past, and change log data 1008CLD-1011CLD for the periods of time between the last snapshot for the respective change stream and the target time. FIG. 10 illustrates that the system may use the change log data particular to each change log stream to bring the snapshot for that partition to a state at a time common for each of the partitions—a time aligned set of snapshots that together constitute a full backup-in-the-past of a table as of the requested time in the past.

As described herein, the aligned set of partitions (the partitions of a table) may be coherent (e.g., the aligned set of backups may represent a state of the database table at a target time (or at least relatively close points-in-time)), but causal consistency is not necessarily guaranteed.

Figure 11:
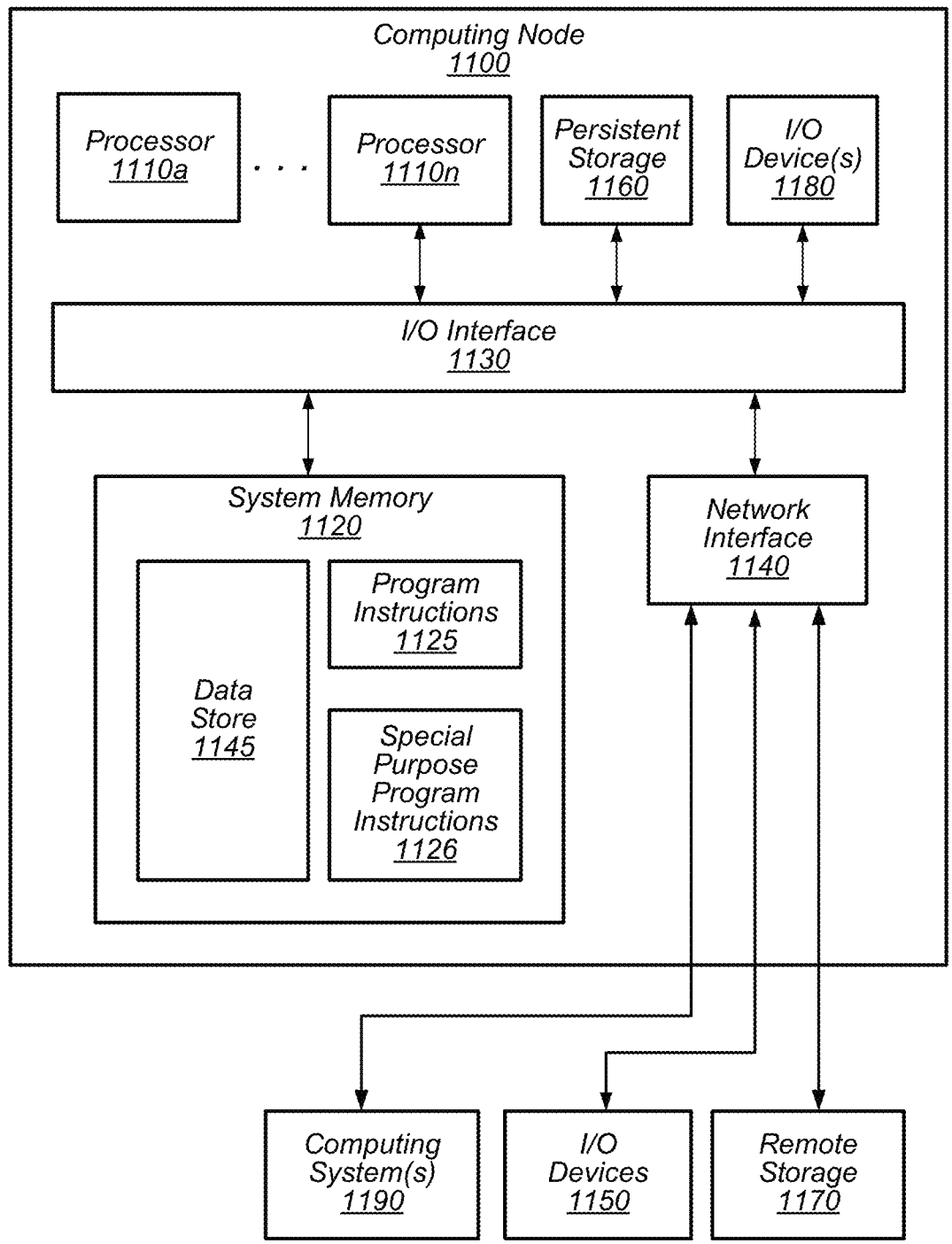
FIG. 11 is a block diagram illustrating a computer system configured to implement at least a portion of a system that includes continuous data protection, according to various embodiments.

In embodiments, the system may perform a backup-in-the-past in a similar fashion for a single partition of a table with multiple partitions, or as depicted in FIG. 11 for Table A, for the table as a whole, using a partition-by-partition process to accomplish the task.

In embodiments, interface 115 may provide a customer-facing interface for a customer to experience a fully managed backup service. For instance, backup interface 115 may provide an interface (e.g., a graphical or program interface) that client devices or processes of a customer can access to manage backups, such as viewing the number of available backups as well as characteristics thereof, requesting backups, and the like.

The disclosed technique may be performed by one or more processes. In one example, one process may be called to obtain the metadata and another process may be called to perform the materialization.

The methods described herein may in various embodiments be implemented by any combination of hardware and software. For example, in one embodiment, the methods may be implemented by a computer system that includes a processor executing program instructions stored on a non-transitory, computer-readable storage medium coupled to the processor. The program instructions may be configured to implement the functionality described herein (e.g., the functionality associated with the continuous data protection service, implemented by a continuous data protection system that generates backups of current database tables as of a time in the past, as well as the functionality of various servers and other components that implement the scalable, distributed data storage systems and/or remote key-value durable backup storage systems described herein (or another type of remote storage system suitable for backing up tables and/or partitions thereof).

FIG. 11 is a block diagram illustrating a computing node configured to implement at least a portion of a continuous data protection system, according to various embodiments described herein. For example, computing node 1100 may represent a computing node that implements one or more of the techniques or components described herein for providing continuous data protection, according to various embodiments. In various embodiments, computing node 1100 may be configured to implement any or all of the components of a system that implements a scalable, distributed data storage system and a corresponding continuous data protection system, or multiple computing nodes similar to or different from computing node 1100 may collectively provide this functionality. For example, in various embodiments, one or more computing nodes 1100 may implement database service 110, snapshot manager 212, change log manager 214, snapshot data store 142, change log archive 152, or clients 160. Additionally, any number of storage node instances may each host one or more replicas of various data partitions and/or metadata associated therewith. For example, any given storage node instance may host a replica acting as master replica for its replica group and/or a replica acting as a slave replica in its replica group.

Similarly, one or more computing nodes 1100 may implement a key-value durable backup storage system (or an interface or other component thereof), in different embodiments. Computing node 1100 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of computing device.

In some embodiments that include multiple computing nodes 1100, all of the computing nodes 1100 may include the same or similar hardware components, software components, and functionality, while in other embodiments the computing nodes 1100 comprising a computing system configured to implement the functionality described herein may include a wide variety of hardware components, software components, and functionality. In some embodiments, multiple computing nodes 1100 that collectively implement a data storage service or a remote storage system may be components of a larger shared resource system or grid computing system. It is noted that different elements of the system described herein may be implemented by different computing nodes 1100. For example, a computer system that supports the functionality described herein for performing continuous data protection may be implemented on the same computing nodes 1100 on which clients (through which a customer or subscriber may access the system) execute, or on one or more other computing nodes 1100, in different embodiments. In another example, different subsystems (e.g., a Web service interface, an admission control subsystem, a service request subsystem; and/or one or more Web servers or other components) may be implemented on or across multiple ones of the computing nodes, and each of the computing nodes may be similar to computing node 1100.

In the illustrated embodiment, computing node 1100 includes one or more processors 1110 (any of which may include multiple cores, which may be single or multi-threaded) coupled to a system memory 1120 via an input/output (I/O) interface 1130. Computing node 1100 further includes a network interface 1140 coupled to I/O interface 1130. In various embodiments, computing node 1100 may be a uniprocessor system including one processor 1110, or a multiprocessor system including several processors 1110 (e.g., two, four, eight, or another suitable number). Processors 1110 may be any suitable processors capable of executing instructions. For example, in various embodiments, processors 1110 may be general-purpose or embedded processors implementing any of a variety of instruction set architectures (ISAs), such as the x86, PowerPC, SPARC, or MIPS ISAs, or any other suitable ISA. In multiprocessor systems, each of processors 1110 may commonly, but not necessarily, implement the same ISA. Similarly, in a distributed computing system such as one that collectively implements a scalable database service or a remote storage service in which tables are baked up, each of the computing nodes may implement the same ISA, or individual computing nodes and/or replica groups of nodes may implement different ISAs.

The computing node 1100 also includes one or more network communication devices (e.g., network interface 1140) for communicating with other systems and/or components over a communications network (e.g. Internet, LAN, etc.). For example, a client application executing on computing node 1100 may use network interface 1140 to communicate with a server application executing on a single server or on a cluster of servers that implement a distributed system. In another example, an instance of a server application executing on computing node 1100 may use network interface 1140 to communicate with other instances of the server application that may be implemented on other computer systems.

In the illustrated embodiment, computing node 1100 also includes one or more persistent storage devices 1160 and/or one or more I/O devices 1180. In various embodiments, persistent storage devices 1160 may correspond to disk drives, tape drives, solid state memory, other mass storage devices, or any other persistent storage device. Computing node 1100 (or a distributed application or operating system operating thereon) may store instructions and/or data in persistent storage devices 1160, as desired, and may retrieve the stored instruction and/or data as needed.

Computing node 1100 includes one or more system memories 1120 that are configured to store instructions and/or data (shown as program instructions 1125 and data store 1145, respectively) that are accessible by processor(s) 1110. In various embodiments, system memories 1120 may be implemented using any suitable memory technology, (e.g., one or more of cache, static random-access memory (SRAM), DRAM, RDRAM, EDO RAM, DDR 10 RAM, synchronous dynamic RAM (SDRAM), Rambus RAM, EEPROM, non-volatile/Flash-type memory, or any other type of memory). System memory 1120 may contain program instructions 1125 that are executable by processor(s) 1110 to implement the methods and techniques described herein.

In the illustrated embodiment, program instructions and data implementing desired functions, methods or techniques (such as functionality for backing up tables, and/or restoring tables from backup using any or all of the mechanisms described herein), are shown stored within system memory 1120 as program instructions 1125. For example, program instruction 1125 may include program instructions that when executed on processor(s) 1110 implement any or all of a continuous data protection system 112, storage service 290, various data stores and archives, and/or any other components, modules, or sub-modules of a system that provides the data storage system and services described herein. Program instructions 1125 may also include program instructions configured to implement additional functionality of a system that implements a data storage service not described herein. In some embodiments, program instructions 1125 may include program instructions configured to implement functionality of a key-value durable backup storage system or another type of remote storage system suitable for backing up tables and/or partitions thereof. In some embodiments, program instructions 1125 may implement multiple separate clients, server nodes, and/or other components.

It is noted that in some embodiments, program instructions 1125 may include instructions and data implementing desired functions that are not directly executable by processor(s) 1110 but are represented or encoded in an abstract form that is translatable to instructions that are directly executable by processor(s) 1110. For example, program instructions 1125 may include instructions specified in an ISA that may be emulated by processor 1110, or by other program instructions 1125 executable on processor(s) 1110. Alternatively, program instructions 1125 may include instructions, procedures or statements implemented in an abstract programming language that may be compiled or interpreted in the course of execution. As non-limiting examples, program instructions 1125 may be encoded in platform native binary, any interpreted language such as Java™ byte-code, or may include code specified in a procedural or object-oriented programming language such as C or C++, a scripting language such as perl, a markup language such as HTML or XML, or any other suitable language or in any combination of languages.

In some embodiments, program instructions 1125 may include instructions executable to implement an operating system (not shown), which may be any of various operating systems, such as UNIX, LINUX, Solaris™, MacOS™, Windows™, etc. Any or all of program instructions 1125 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computing node 1100 via I/O interface 1130. A non-transitory computer-readable storage medium may also include any volatile or non-volatile media such as RAM (e.g. SDRAM, DDR SDRAM, RDRAM, SRAM, etc.), ROM, etc., that may be included in some embodiments of computing node 1100 as system memory 1120 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 1140.

In other embodiments, program instructions and/or data as described herein for implementing a data storage service that employs the techniques described above may be received, sent or stored upon different types of computer-readable media or on similar media separate from system memory 1120 or computing node 1100. Program instructions and data stored on a computer-readable storage medium may be transmitted to a computing node 1100 for execution by a processor 1110 by transmission media or signals such as electrical, electromagnetic, or digital signals, which may be conveyed via a communication medium such as a network and/or a wireless link, such as may be implemented via network interface 1140. In some embodiments, system memory 1120 may include data in data store 1145 and/or program instructions 1125 and/or special purpose instructions 1126, which may be configured as described herein. In some embodiments, data store 1145 may store the snapshots, or the change stream items, for example. In some embodiments, special purpose program instructions 1126 may include instructions that implement the continuous data protection manager 112, the storage service 290, or the database service 110, for example.

In some embodiments, system memory 1120 may include data store 1145, which may be configured as described herein. For example, the information described herein as being stored by the scalable, distributed data storage system (e.g., table data, metadata for tables, partitions and backups, transaction information, configuration information for tables and/or partitions, or other information used in performing the methods described herein may be stored in data store 1145 or in another portion of system memory 1120 on one or more nodes, in persistent storage 1160, and/or in remote storage 1170, in various embodiments. In some embodiments, and at various times, system memory 1120 (e.g., data store 1145 within system memory 1120), persistent storage 1160, and/or remote storage 1170 may store copies of table data (e.g., partition data) backup copies of table and/or partition data, metadata associated with tables, partitions, backups, transactions and/or their states, database configuration information, and/or any other information usable in implementing the methods and techniques described herein. In some embodiments, remote storage 1170 may be a key-value durable storage system in which tables (and/or partitions thereof) are backed up and from which they are restored, as described herein.

Data store 1145 may in various embodiments include collections of data maintained by a data storage service on behalf of its clients/users, and/or metadata used by a computing system that implements such a service, as described herein (including, but not limited to, tables managed and maintained on behalf of clients/users of the service, metadata tables, business rules, partition maps, routing tables, indexes, namespaces and/or partitions thereof, service level agreement parameter values, subscriber preferences and/or account information, performance data, resource capacity data, resource usage data, provisioned resource utilization data, reserved resource data, resource reservation IDs, resource reservation timeout period values, parameter values for various partition management policies, limits, or constraints, and/or information about candidate partition management operations).

In one embodiment, I/O interface 1130 may be configured to coordinate I/O traffic between processor(s) 1110, system memory 1120 and any peripheral devices in the system, including through network interface 1140 or other peripheral interfaces. In some embodiments, I/O interface 1130 may perform any necessary protocol, timing or other data transformations to convert data signals from one component (e.g., system memory 1120) into a format suitable for use by another component (e.g., processor 1110). In some embodiments, I/O interface 1130 may include support for devices attached through various types of peripheral buses, such as a variant of the Peripheral Component Interconnect (PCI) bus standard or the Universal Serial Bus (USB) standard, for example. In some embodiments, the function of I/O interface 1130 may be split into two or more separate components, such as a north bridge and a south bridge, for example. Also, in some embodiments, some or all of the functionality of I/O interface 1130, such as an interface to system memory 1120, may be incorporated directly into processor 1110.

Network interface 1140 may be configured to allow data to be exchanged between computing node 1100 and other devices attached to a network, such as other computer systems 1190 (which may implement one or more server nodes and/or clients of a scalable, distributed data storage system and/or a remote key-value durable storage system), for example. In addition, network interface 1140 may be configured to allow communication between computing node 1100 and various I/O devices 1150 and/or remote storage 1170), or between other nodes in a system providing shared computing services. In general, network interface 1140 may be configured to allow data to be exchanged between computing node 1100 and any of a variety of communication devices, external storage devices, input/output devices and/or other computing devices, in different embodiments.

Input/output devices 1150 may, in some embodiments, include one or more display terminals, keyboards, keypads, touchpads, scanning devices, voice or optical recognition devices, or any other devices suitable for entering or retrieving data by one or more computing nodes 1100. Multiple input/output devices 1150 may be present in computing node 1100 or may be distributed on various nodes of a distributed system that includes computing node 1100. In some embodiments, similar input/output devices may be separate from computing node 1100 and may interact with one or more nodes of a distributed system that includes computing node 1100 through a wired or wireless connection, such as over network interface 1140. Network interface 1140 may commonly support one or more wireless networking protocols (e.g., Wi-Fi/IEEE 802.11, or another wireless networking standard). However, in various embodiments, network interface 1140 may support communication via any suitable wired or wireless general data networks, such as other types of Ethernet networks, for example. Additionally, network interface 1140 may support communication via telecommunications/telephony networks such as analog voice networks or digital fiber communications networks, via storage area networks such as Fibre Channel SANs, or via any other suitable type of network and/or protocol. In various embodiments, computing node 1100 may include more, fewer, or different components than those illustrated in FIG. 11 (e.g., displays, video cards, audio cards, peripheral devices, other network interfaces such as an ATM interface, an Ethernet interface, a Frame Relay interface, etc.)

Storage service clients (e.g., users, subscribers and/or client applications) may interact with a data storage service such as that described herein in various ways in different embodiments, such as to submit requests for service (including, but not limited to, requests to create and/or partition tables, requests to store, retrieve and/or update items in tables, or requests to split, move, or otherwise repartition a table), and to receive results. For example, some subscribers to the service may have physical access to computing node 1100, and if so, may interact with various input/output devices 1150 to provide and/or receive information. Alternatively, other clients/users may use client computing systems to access the system, such as remotely via network interface 1140 (e.g., via the Internet and/or the World Wide Web). In addition, some or all of the computing nodes of a system providing the service may provide various feedback or other general types of information to clients/users (e.g., in response to user requests) via one or more input/output devices 1150.

It is noted that any of the distributed system embodiments described herein, or any of their components, may be implemented as one or more web services. For example, a front-end module or administrative console of a Web services platform may present data storage services and/or database services to clients as web services. In some embodiments, a web service may be implemented by a software and/or hardware system designed to support interoperable machine-to-machine interaction over a network. A web service may have an interface described in a machine-processable format, such as the Web Services Description Language (WSDL). Other systems may interact with the web service in a manner prescribed by the description of the web service's interface. For example, the web service may define various operations that other systems may invoke, and may define a particular application programming interface (API) to which other systems may be expected to conform when requesting the various operations.

In various embodiments, a web service may be requested or invoked through the use of a message that includes parameters and/or data associated with the web services request. Such a message may be formatted according to a particular markup language such as Extensible Markup Language (XML), and/or may be encapsulated using a protocol such as Simple Object Access Protocol (SOAP). To perform a web services request, a web services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some embodiments, web services may be implemented using Representational State Transfer ("RESTful") techniques rather than message-based techniques. For example, a web service implemented according to a RESTful technique may be invoked through parameters included within an HTTP method such as PUT, GET, or DELETE, rather than encapsulated within a SOAP message.

Those skilled in the art will appreciate that computing node 1100 is merely illustrative and is not intended to limit the scope of embodiments. In particular, the computing system and devices may include any combination of hardware or software that can perform the indicated functions, including computers, network devices, internet appliances, PDAs, wireless phones, pagers, etc. Computing node 1100 may also be connected to other devices that are not illustrated, in some embodiments. In addition, the functionality provided by the illustrated components may in some embodiments be combined in fewer components or distributed in additional components. Similarly, in some embodiments the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computing system via inter-computer communication. Some or all of the system components or data structures may also be stored (e.g., as instructions or structured data) on a computer-readable storage medium or a portable article to be read by an appropriate drive, various examples of which are described above. In some embodiments, instructions stored on a computer-readable storage medium separate from computing node 1100 may be transmitted to computing node 1100 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-readable storage medium. Accordingly, different embodiments may be practiced with other computer system configurations.

Note that while several examples described herein are directed to the application of various techniques in systems that include a non-relational database, in other embodiments these techniques may be applied in systems in which the distributed data store is implemented using a different storage paradigm.

The various methods as illustrated in the figures and described herein represent example embodiments of methods. The methods may be implemented manually, in software, in hardware, or in a combination thereof. The order of any method may be changed, and various elements may be added, reordered, combined, omitted, modified, etc.

Those skilled in the art will appreciate that in some embodiments the functionality provided by the methods discussed above may be provided in alternative ways, such as being split among more software modules or routines or consolidated into fewer modules or routines. Similarly, in some embodiments illustrated methods may provide more or less functionality than is described, such as when other illustrated methods instead lack or include such functionality respectively, or when the amount of functionality that is provided is altered. In addition, while various operations may be illustrated as being performed in a particular manner (e.g., in serial or in parallel) and/or in a particular order, those skilled in the art will appreciate that in other embodiments the operations may be performed in other orders and in other manners. Those skilled in the art will also appreciate that the data structures discussed above may be structured in different manners, such as by having a single data structure split into multiple data structures or by having multiple data structures consolidated into a single data structure. Similarly, in some embodiments illustrated data structures may store more or less information than is described, such as when other illustrated data structures instead lack or include such information respectively, or when the amount or types of information that is stored is altered. The various methods as depicted in the figures and described herein represent illustrative embodiments of methods. The methods may be implemented in software, in hardware, or in a combination thereof in various embodiments. Similarly, the order of any method may be changed, and various elements may be added, reordered, combined, omitted, modified, etc., in various embodiments.

From the foregoing it will be appreciated that, although specific embodiments have been described herein for purposes of illustration, various modifications may be made without deviating from the spirit and scope of the appended claims and the elements recited therein. In addition, while certain aspects are presented below in certain claim forms, the inventors contemplate the various aspects in any available claim form. For example, while only some aspects may currently be recited as being embodied in a computer readable storage medium, other aspects may likewise be so embodied.

The invention claimed is:

1. A system, comprising:
    a plurality of storage nodes, each of which comprises one or more storage devices or logical storage volumes that implement a database service that stores data in partitions;
    a copy data store that stores a separate copy for each of a plurality of partitions of a database table;
    a change log archive that stores separate change logs for each partition; and
    a past state copy generator to perform:
        receive, via an API, a request to generate a copy of a current database table as of a time in the past,
        obtain table metadata for the requested copy;
        read a separate copy for each of a plurality of partitions of the current database table;
        identify a segment of a separate respective change log for each partition based on the requested time in the past and a respective creation time for each separate partition copy;
        apply the identified segments of the change logs to the respective partition copies to generate new partition copies corresponding to the requested time in the past; and
        write the new partition copies to locations different from the partitions of the current database table, to generate the copy of the database table as of the requested time in the past.

2. The system recited in claim 1, wherein the system receives requests to generate a copy of a current database table as of a time in the past via a graphical user interface comprising user interface elements to:
    request a copy of a current database table as of a time in the past,
    specify the particular current database table to be copied, and
    specify the time in the past for the copy.

3. The system recited in claim 1, wherein to obtain the table metadata for the requested copy the past state copy generator is further to:
  read table metadata for the current database table;
  identify a set of metadata changes corresponding to the current database table based on the requested time in the past; and
  apply the identified set of metadata changes to the table metadata for the current database table to generate the table metadata for the requested copy.

4. The system recited in claim 1, the system to:
  responsive to a request to generate a copy of another current database table as of another time in the past:
    acknowledge generation of the copy of the other current database table;
    subsequent to said acknowledge, apply segments of corresponding logs to respective partition copies to generate other new partition copies corresponding to the other requested time in the past; and
    write the other new partition copies to locations different from the partitions of the other current database table, to generate the copy of the other database table as of the other time in the past.

5. The system recited in claim 1, wherein the system is further to:
  identify that a requested generation of a copy of a current database table as of a time in the past has failed; and
  automatically re-request to generate the copy of the current database table as of the time in the past.

6. A method, comprising:
  reading, responsive to a request to generate a copy of a current database table as of a time in the past, a separate copy for each of a plurality of partitions of the current database table;
  selecting segments of respective change logs for each partition to apply to the respective copies of the partitions based on the requested time in the past to generate new partition copies corresponding to the time in the past; and
  writing the new partition copies to locations different from the partitions of the current database table, to generate the copy of the database table as of the requested time in the past.

7. The method as recited in claim 6,
  providing an interface for requesting generation of copies of current database tables as of a time in the past;
  receiving, via the interface, one or more requests to generate a copy of a current database table as of a time in the past; and
  performing said reading, said selecting, and said writing for each of the one or more requests.

8. The method as recited in claim 6, wherein:
  wherein the separate copies for each of the plurality of partitions are separate snapshots for each of the plurality of partitions;
  a creation time for a particular snapshot of the snapshots is chronologically subsequent to the time in the past;
  said selecting the segment of the respective change log for the particular partition comprises:
    selecting the segment of the respective change log based on changes in the respective change log after the time in the past and prior to a creation time corresponding to the respective change log; and
    applying the changes in the respective change log after the time in the past to the particular snapshot to generate the respective new snapshot for the particular partition for the time in the past.

9. The method as recited in claim 6, further comprising:
  reading table metadata for the current database table;
  identifying a set of metadata changes corresponding to the current database table based on the requested time in the past; and
  applying the identified set of metadata changes to the table metadata for the current database table to generate the table metadata for the requested copy.

10. The method recited in claim 6, wherein:
  said separate copies for each of the plurality of partitions are separate snapshots for each of the plurality of partitions, and
  said request to generate the copy of the current database table as of the time in the past comprises a request to generate a backup of the current database table;
  the method further comprising:
  retaining, for the current database table, the snapshots and the change logs for a retention window of time that is determined by a configurable storage window parameter;
  receiving an update to the configurable storage window parameter for the current database table;
  updating, based on the received update, the configurable storage window parameter for the current database table; and
  retaining, for the current database table, the snapshots and the change logs for a new retention window of time that is determined by the updated configurable storage window parameter.

11. The method recited in claim 6, wherein:
  said separate copies for each of the plurality of partitions are separate snapshots for each of the plurality of partitions, and
  said request to generate the copy of the current database table as of the time in the past comprises a request to generate a backup of the current database table;
  the method further comprising:
  retaining, for the current database table, the snapshots and the change logs for a retention window of time that is determined by a configurable storage window parameter;
  triggering, at a time based on the retention window of time, said reading, said selecting, and said writing;
  receiving an update to the configurable storage window parameter for the current database table;
  updating, based on the received update, the configurable storage window parameter for the current database table, wherein the retention window of time is changed based on the receive update; and
  subsequent to receipt of another request to generate another copy of the current database table as of another time in the past,
    triggering, at a time based on the changed retention window of time, said reading, said selecting, and said writing for the other time in the past.

12. The method recited in claim 6, where
  said separate copies for each of the plurality of partitions are separate snapshots for each of the plurality of partitions, and
  said request to generate the copy of the current database table as of the time in the past comprises a request to generate a backup of the current database table;

the method further comprising:
receiving another request to generate a backup of another current database table as of another time in the past;
acknowledging that the backup of the other current database table as of the other time in the past has been generated;
subsequent to said acknowledging,
reading, a separate snapshot for each of a plurality of partitions of the other current database table;
selecting segments of respective change logs for each partition to apply to the respective snapshots of the partitions based on the requested other time in the past to generate new partition snapshots corresponding to the other time in the past; and
writing the new partition snapshots to locations different from the partitions of the other current database table, to generate the backup of the other database table as of the requested other time in the past.

13. The method recited in claim 6, wherein:
said separate copies for each of the plurality of partitions are separate snapshots for each of the plurality of partitions,
said request to generate the copy of the current database table as of the time in the past comprises a request to generate a backup of the current database table, and
the snapshots and corresponding change logs are stored for an initial time window;
the method further comprising:
identifying a first amount of storage space associated with storing the snapshots and corresponding change logs;
identifying a second amount of storage space associated with storing backups instead of the snapshots and corresponding change logs;
transmitting, based on a comparison of the first amount of storage space or the second amount of storage space, a recommendation to store either the backups, or the snapshots and corresponding change logs; and
responsive to acceptance of the recommendation, causing either the backups, or the snapshots and corresponding change logs to be archived for a period of time beyond the initial time window.

14. A non-transitory computer-readable storage medium storing program instructions that, if executed by a processor, cause the processor to perform:
reading, responsive to a request to generate a copy of a current database table as of a time in the past, a separate copy for each of a plurality of partitions of the current database table;
selecting segments of respective change logs for each partition to apply to the respective copies of the partitions based on the requested time in the past to generate new partition copies corresponding to the time in the past; and
writing the new partition copies to locations different from the partitions of the current database table, to generate the copy of the database table as of the requested time in the past.

15. The non-transitory computer-readable storage medium in claim 14,
wherein the request to generate the copy is a request to generate a backup;
wherein at least one creation time for a respective separate partition of the database is distinct from another creation time of another respective separate partition of the database;
wherein the program instructions if executed by the processor, further cause the processor to perform:
identifying a segment of a respective change log corresponding to the one creation time for the respective separate partition; and
identifying another segment of another respective change log corresponding to the other creation time for the other respective separate partition;
wherein the segment and the other segment are for different lengths of time.

16. The non-transitory computer-readable storage medium in claim 14,
wherein the request to generate the copy of the current database table is a request for a backup of the current database table; and
wherein the program instructions if executed by the processor, further cause the processor to perform:
providing an interface for requesting generation of backups of current database tables as of a time in the past, wherein the interface comprises one or more interface elements to specify the time in the past;
receiving, via the interface, a request to generate a backup of a current database table as of a time in the past specified by the one or more interface elements; and
acknowledging, via the interface, generation of the requested copy as of the specified time in the past.

17. The non-transitory computer-readable storage medium in claim 14,
wherein the request to generate the copy of the current database table is a request for a backup of the current database table; and
wherein the program instructions if executed by the processor, further cause the processor to perform:
providing an interface for requesting generation of backups of current database tables as of a time in the past, wherein the interface comprises one or more interface elements that specify:
the time in the past,
an identifier for the current database table, and
a location for storing the requested backup;
receiving, via the interface, a request to generate a backup of a current database table; and
acknowledging, via the interface, storage of the requested copy of the identified database table to the specified location as of the specified time in the past.

18. The non-transitory computer-readable storage medium in claim 14, wherein the program instructions if executed by the processor, further cause the processor to perform:
retaining change logs for another current database table for a window of time determined by a configurable parameter;
receiving a request to generate a copy of the other current database table as of another time in the past;
subsequent to a trigger time that is based at least in part on the window of time for retaining the change logs:
reading a separate copy for each of a plurality of partitions of the other current database table;
selecting segments of respective change logs for each partition of the other current database table to apply to the respective copies of the partitions based on the requested other time in the past to generate other new partition copies corresponding to the other time in the past; and writing the other new partition copies to locations different from the partitions of the other current database table, to generate the other copy of the database table as of the other requested time in the past.

19. The non-transitory computer-readable storage medium in claim 14, wherein the program instructions if executed by the processor, further cause the processor to perform:

receiving another request to generate a copy of another current database table as of another time in the past;

acknowledging that the copy of the other current database table as of the other time in the past has been generated;

subsequent to said acknowledging, reading, a separate copy for each of a plurality of partitions of the other current database table;

selecting segments of respective change logs for each partition to apply to the respective copies of the partitions based on the requested other time in the past to generate new partition copies corresponding to the other time in the past; and writing the new partition copies to locations different from the partitions of the other current database table, to generate the copy of the other database table as of the requested other time in the past.

20. The non-transitory computer-readable storage medium in claim 14, wherein the program instructions if executed by the processor, further cause the processor to perform:

reading table metadata for the current database table;

identifying a set of metadata changes corresponding to the current database table based on the requested time in the past; and applying the identified set of metadata changes to the table metadata for the current database table to generate the table metadata for the requested copy.

* * * * *